United States Patent [19]
Ito et al.

[11] Patent Number: 5,805,076
[45] Date of Patent: Sep. 8, 1998

[54] MOBILE COMMUNICATIONS SYSTEM

[75] Inventors: Shogo Ito, Yokohama; Yasushi Yamao, Yokosuka, both of Japan

[73] Assignee: NTT Mobile Communications Network Inc., Tokyo, Japan

[21] Appl. No.: 481,433

[22] PCT Filed: Oct. 19, 1994

[86] PCT No.: PCT/JP94/01754

§ 371 Date: Mar. 19, 1996

§ 102(e) Date: Mar. 19, 1996

[87] PCT Pub. No.: WO95/11575

PCT Pub. Date: Apr. 27, 1995

[30] Foreign Application Priority Data

Oct. 20, 1993 [JP] Japan .................................. 5/262601

[51] Int. Cl.⁶ .............................. H04B 7/00; H04Q 1/00; H04Q 7/00
[52] U.S. Cl. ................. 340/825.44; 340/825.52; 371/47.1; 455/31.1; 455/32.1; 455/68; 455/70; 455/95
[58] Field of Search .................. 340/825.44, 825.52; 371/47.1, 48; 455/31.1, 32.1, 33.1, 49.1, 54.1, 68, 70, 95

[56] References Cited

U.S. PATENT DOCUMENTS

| | | | |
|---|---|---|---|
| 4,392,242 | 7/1983 | Kai | 455/33 |
| 4,720,710 | 1/1988 | Akahori et al. | 340/825.44 |
| 4,777,655 | 10/1988 | Numata et al. | 455/76 |
| 4,783,654 | 11/1988 | Ichikawa | 340/825.44 |
| 5,574,972 | 11/1996 | Hulbert | 455/33.1 |
| 5,574,977 | 11/1996 | Joseph et al. | 455/58.1 |

FOREIGN PATENT DOCUMENTS 2-303235  12/1990  Japan .

*Primary Examiner*—Michael Horabik
*Assistant Examiner*—Yonel Beaulieu
*Attorney, Agent, or Firm*—Cushman Darby & Cushman IP Group of Pillsbury Madison & Sutro LLP

[57] ABSTRACT

In a mobile communications system wherein the transmission form changes in the course of the signal, high quality transmission of change information relating to the transmission form is obtained. To achieve this, information giving advance notice of a change is transmitted prior to transmitting the change information relating to the transmission form. Even if a situation arises in which transmitted information has not been conveyed without error at a scheduled change time that was notified in advance, it is possible to resolve this situation by referring to the information giving advance notice of the change. This enables faulty paging and other defects resulting from erroneous changes of transmission form to be reduced.

11 Claims, 21 Drawing Sheets

10

MOBILE COMMUNICATIONS SYSTEM

TECHNICAL FIELD

This invention is utilized in mobile radio communications, and is suitable for use in cellular telecommunication systems and radio paging systems. It relates in particular to the control techniques involved in changing transmission parameters or transmission mode.

BACKGROUND TECHNOLOGY

Recent years have witnessed a growing demand for mobile communications and a desire for a diversification of services. In response to these pressures, there are now communications systems with variable transmission parameters or transmission nodes, and these serve as a means for making effective use of limited frequency resources and for responding flexibly to traffic fluctuations and service diversification. The term "transmission parameters" includes for example, transmission speed, modulation scheme, error control scheme (forward error correction, number of retransmissions, and application or non-application of interleaving), frequency, and transmitted information (type of service). Combinations of these transmission parameters are termed "transmission modes". Hereinafter, transmission parameters or a transmission mode will be called the "transmission form".

Prior art examples of selective radio paging systems will be explained with reference to FIG. 15–FIG. 19. FIG. 15 is an overall block diagram of a selective radio paging system. FIG. 16 shows an asynchronous format paging signal sequence. FIG. 17 is a flowchart showing the operation of a selective radio paging system employing asynchronous format paging signal sequences. FIG. 18 shows a synchronous format paging signal sequence. FIG. 19 is a flowchart showing the operation of a selective radio paging system employing synchronous format paging signal sequences. Central station 1, shown in FIG. 15, functions both as a control station which controls base stations 10–17, and as a base station. Central station 1 transfers to base stations 10–17, via links 30–37, paging signal sequences comprising paging signal groups R that are to be transmitted to radio paging receivers 20–22, plus synchronization signals S and control signals C. Central station 1 and base stations 10–17 transmit paging signal sequences while maintaining mutual phase synchronization.

The case where paging signal sequences have an asynchronous format will be explained with reference to FIG. 16 and FIG. 17. As shown in FIG. 16(1), paging signal sequences transmitted from central station 1 and base station 10–17 comprise: synchronization signals S for identifying the headers of frames of the paging signal sequence; control signals C for specifying the transmission form and switching the transmission form of radio paging receivers 20–22; and paging signal groups R. As shown in FIG. 16(2), a paging signal group R contains address signals A1–Ak which are customer ID signals, and message signals M1–Mk. The value of k changes according to traffic conditions. An error detection code is usually added to control signal C, and this increases the transmission reliability. In FIG. 16, the transmission form is initially "α" and the paging signal groups are transmitted in this form, but the transmission form is altered by the control signal C which is received immediately before time t0, and subsequent to time to the transmission form is "β" and paging signal groups are transmitted in this form.

As shown in FIG. 17, when a synchronization signal S is detected in a received paging signal sequence (S1) and no error is detected in the following control signal C (S2), preparations are made to receive the subsequent paging signal group R on the basis of the transmission form indicated by this received control signal C (S3). Paging signal group R is then received (S4). It is checked whether or not the address number of a given radio paging receiver 20–23 (hereinafter, termed "pagers" for short) is present in the received paging signal group R (S5). If it is, paging processing is carried out, wherein, an alert is emitted by the pager in question, and message signals M1–Mk that follow address signals A1–Ak are displayed on a liquid crystal display or the like (S6). On the other hand, if an error has been detected in control signal C (S2), preparations are made to receive the subsequent paging signal group R on the basis of the transmission form indicated by a control signal C that was previously received without error (S7); whereupon paging signal group R is received (S4), address numbers are checked (S5), and paging processing is carried out (S6).

A synchronous format, in which paging signal sequences are transmitted periodically, will now be explained with reference to FIG. 18 and FIG. 19. In the paging signal sequence shown in FIG. 18, frames of period T comprise n subframes (of signal length τ), and subframes i comprise synchronization signal S, control signal C and paging signal group $R_i$. The advantage of using a synchronous format is that a given pager receives, intermittently, only the subframes assigned to it, with the result that pager battery life is extended. In other words, pagers are divided in advance into n groups, and one or more of n subframes is or are assigned to each group, with the result that pagers become capable of receiving only during assigned subframes. The transmission form can be changed in each subframe. FIG. 18 shows the case where, at time t0, the transmission form of the paging signal group in subframe i, and of subsequent paging signal groups in subsequent subframes i, changes from α to β.

As shown in FIG. 19, after a synchronization signal S—these synchronization signals being received with a period T—has been detected and the synchronization state has been acquired (S11), a pager becomes capable of receiving only in an assigned subframe (S12). When no error is detected in the received control signal C (S13), preparations are made to receive subsequent paging signal group $R_i$ on the basis of the transmission form indicated by this control signal C (S14). Paging signal group $R_i$ is received (S15), and if the address number of the pager in question is detected in it (S16), paging processing is performed as described above (S17). On the other hand, if an error is detected in control signal C (S13), preparations are made to receive subsequent paging signal group $R_i$ on the basis of the transmission form indicated by a control signal C that was previously received without error (S18), whereupon paging signal group $R_i$ is received (S15), address numbers are checked (S16), and paging processing is performed (S17).

The synchronization signals and control signals may also be present every plural number of subframes in the paging signal sequence, in which case the transmission form can change in units comprising this plural number of subframes. The operation in this case is the same as in FIG. 19, with the exception that a pager becomes capable of receiving only in assigned subframes which contain synchronization and control signals.

Next, a prior art example of a cellular telecommunication system will be explained with reference to FIG. 20. FIG. 20 shows the overall constitution of such a system, which comprises mobile station 50 and base station side facilities 45. Mobile station 50 carries out radio communications with base stations 41 and 42, and is used as subscriber communications terminal equipment, and comprises an antenna, a transceiver, a controller, a hand set, etc. Base station side facilities 45 comprise: base stations 41 and 42, which have antennas, transceivers, controllers, and the like; and control station 40 which performs switching, billing, etc. It is also feasible to have, instead of control station 40 shown in FIG. 20, a central station which combines the functions of control station 40 and base stations 41 and 42.

FIG. 21 shows the format (synchronous) of the signal sequences transmitted and received between base stations 41 and 42 and mobile station 50. This format is based on full-rate transmission in a digital cellular telecommunication system. The signals have a period T of 20 ms, and consist of three signal groups. Each signal group comprises a synchronization signal, a control signal, and user signals in which message signals and the like are inserted (see *Digital Mobile Communications*, ed. Mbriji Kuwabara, pp.66–67, Kagaku Shinbunsha, September 1992; and *Digital Cellular Telecommunication System Standards*, RCR STD-27B). In cellular telecommunication systems, the signal group which mobile station 50 transmits and receives is assigned every time communication begins, and once a signal group has been assigned, message signals—i.e., voice signals and non-voice signals (G3 facsimile signals, MNP signals, and the like)—are transmitted to one subscriber only in the user signals of said signal group.

FIG. 22 shows the use of these signals to change from non-voice communication to voice communication in a prior art example of a cellular telecommunication system. When the non-voice communication comes to an end, mobile station 50 uses a control signal to transmit additional information which is a switching request signal (a non-voice communication request). (It will be assumed here that this additional information is transmitted at time t0.) Base station side facilities 45 which have received this additional information use control signals to transmit additional information which is a switching confirmation signal (non-voice communication inactive). Thereafter, both commence voice communication (see *Digital Mobile Communications*, ed. Mboriji Kuwabara, pp.158–159, Kagaku Shinbunsha, September 1992; and *Digital Cellular Telecommunication System Standards*, RCR STD-27B).

In each of the prior art examples discussed above there are circumstances in which, due to fading and other conditions encountered in mobile communications, transmission quality will deteriorate and errors will occur in the control signals. For example, in FIG. 16 and FIG. 18, if an error has occurred in the control signal immediately before time t0 which the transmission form changes, it becomes impossible to change the transmission form to "β". In the prior art techniques, this results in a paging signal group being received using "α", which is the previous transmission form. As a result, correct address checking and paging processing of the paging signal group immediately after time t0 ceases to be possible, and this leads to the following problems: paging signals which rightfully should have been received are not received, and paging signals addressed to another pager are mistaken for signals addressed to the pager in question, and paging processing performed. These problems also occur in similar manner in cellular telecommunication systems, and can therefore hinder both paging and voice communications.

The present invention has been devised in the light of this situation, and its object is to provide a mobile communications system capable of high quality transmission of control signals containing transmission form information, even in mobile communications channels where transmission quality deteriorates due to fading and so forth.

BRIEF SUMMARY OF THE INVENTION

According to this invention, there is provided mobile communications system which has a base station and a mobile station connected to this base station by a radio channel. This base station or mobile station has a means which transmits and receives while switching among a plurality of transmission parameters or transmission modes: a mobile communications system in which the aforementioned base station or mobile station has a means which transmits an announcement signal which gives notice of a change of the aforementioned transmission parameters or transmission mode in advance of said change.

According to this invention, there is provided a selective radio paging system which has: a base station which includes a means which transmits a paging signal sequence containing control signals and one or more address signals; and a radio paging receiver which includes a means which receives this paging signal sequence, detects that its own address signal is contained therein, and excites a paging output the aforementioned base station includes a means which transmits while switching among a plurality of transmission parameters or transmission modes, and a means which, accompanying this switching, transmits control signals containing transmission form information which provides notification of the transmission parameters or transmission mode. The aforementioned radio paging receiver has a means which switches to and selects transmission parameters or a transmission mode suited to the transmission parameters or transmission mode communicated by the aforementioned transmission form information. A selective radio paging system wherein the aforementioned base station has a means which transmits an announcement signal which gives notice of a change of the aforementioned transmission parameters or transmission mode in advance of the change is also contemplated by the present invention.

The aforementioned information which gives advance notice (hereinafter, termed "advance notice information") should contain information relating to the time at which the change is scheduled (hereinafter, termed the "scheduled change time"), or to the time interval until such time. In this case, the aforementioned receiver means which switches and selects should have: a means which receives this advance notice information and stores the scheduled change time in advance; and a means which, when a control signal has been received erroneously at this scheduled change time, stops the output of the receiving means until a control signal is next received without error.

When there are two transmission parameters or transmission modes (α and β), the aforementioned receiver means which switches and selects can also have: a means which receives the aforementioned advance notice information and stores the scheduled change time in advance; and a means which, when a control signal has been received erroneously at this scheduled change time, switches to and selects transmission parameters or a transmission mode suited, not to the transmission parameters or transmission mode in use up to this scheduled change time (α), but to the other transmission parameters or transmission mode (β).

The aforementioned advance notice information can also contain information relating to the scheduled change time or the time interval until such time, plus information relating to the transmission parameters or transmission mode subsequent to the change. In this case, the aforementioned receiver means which switches and selects can have: a means which receives this advance notice information and stores, in advance, information relating to the scheduled change time and to the transmission parameters or transmission mode subsequent to the change; and a means which, when a control signal has been received erroneously at this scheduled change time, switches to and selects transmission parameters or a transmission mode in accordance with the information relating to the transmission parameters or transmission mode subsequent to the change, which has been stored in the aforementioned storing means.

This invention provides the radio paging receiver or base station side facility that is used in this selective radio paging system.

According to this invention, there is provided, a cellular telecommunication system which has: a base station or a mobile station which includes a means which transmits and receives signal sequences comprising control signals and user signals; and a mobile station or a base station connected to the aforementioned base station or mobile station by radio communication channels; and wherein the aforementioned base station or mobile station includes: a means which transmits and receives while switching among a plurality of transmission parameters or transmission modes; and a means which, accompanying this switching, transmits and receives control signals containing transmission form information which provides notification of the transmission parameters or transmission mode. The aforementioned mobile station or base station has a means which switches to and selects transmission parameters or a transmission mode suited to the transmission parameters or transmission mode communicated by the aforementioned transmission form information. Thus a cellular telecommunication system wherein the aforementioned base station or mobile station has a means which transmits announcement signals which give notice of a change of the aforementioned transmission parameters or transmission mode in advance of the change is contemplated by the present invention.

The aforementioned advance notice information should contain information relating to the scheduled change time or to the time interval until such time. In this case, the aforementioned means which switches and selects should have: a means which receives this advance notice information and stores the scheduled change time in advance, and a means which, when a control signal has been received erroneously at this scheduled change time, stops the output of the receiving means of the aforementioned base station or mobile station until a control signal is next received without error.

When there are two transmission parameters or transmission modes (α and β), the aforementioned means which switches and selects can also have: a means which receives the aforementioned advance notice information and stores the scheduled change time in advance; and a means which, when a control signal has been received erroneously at this scheduled change time, switches to and selects transmission parameters or a transmission mode suited, not to the transmission parameters or transmission mode in use up to this scheduled change time (α), but to the other transmission parameters or transmission mode (β).

The aforementioned advance notice information can also contain information relating to the scheduled change time or the time interval until such time, plus information relating to the transmission parameters or transmission mode scheduled after the change. In this case, the aforementioned means which switches and selects can have: a means which receives this advance notice information and stores its scheduled change time and transmission parameters or transmission mode scheduled after the change; and a means which, when a control signal has been received erroneously at this scheduled change time, transmits and receives after switching to the transmission parameters or transmission mode that has been stored in this storing means.

There can also be a means which monitors the series of communications protocols based on given transmission parameters or a given transmission mode, and which gives advance notice of the end of this series of protocols.

This invention provides the mobile unit or base station side facility that is used in this cellular telecommunication system.

In a selective radio paging system or cellular telecommunication system according to the invention thus constituted, a mobile station, having received transmission form change information, selects and switches to a transmission form suited to the transmission form. A base station transmits information giving advance notice of a change prior to transmission of the change information. Accordingly, even if a situation arises in which, due to deterioration of transmission quality, etc., change information is not received, information giving advance notice of the change has been communicated beforehand to the mobile station. Therefore it is possible to adopt a scheme for overcoming this situation.

A concrete example of such a scheme is as follows: if the scheduled change time has passed and it has not been possible to receive a control signal without error, the processing involved in receiving signal groups is halted until the next control signal is received without error. This makes it possible to avoid performing reception processing on a wrong signal group due to the use of an inappropriate transmission form. Alternatively, when there are only two transmission forms, the following scheme may be adopted: namely, if the scheduled change time has passed and it has not been possible to receive a control signal without error, a decision can be made at the mobile station side to switch to the transmission form that is different from the transmission form that has been in use up to the present time.

If information relating to the transmission form subsequent to a change is added to the scheduled change time, then the following scheme can be adopted. Namely, even if there are many transmission forms, when the scheduled change time has passed and it has not been possible to receive a control signal without error, a decision can be made at the mobile station side to switch to the transmission form which was scheduled after the change, and which has been communicated beforehand.

In these ways, high quality transmission of control signals containing transmission form information can be achieved even in mobile communications channels where transmission quality deteriorates due to fading and so forth.

It should be noted that similar explanations could be given even if the positions of "base station" and "mobile station" in the foregoing explanations were reversed.

DETAILED DESCRIPTION OF THE INVENTION

First Embodiment

Figure 1:
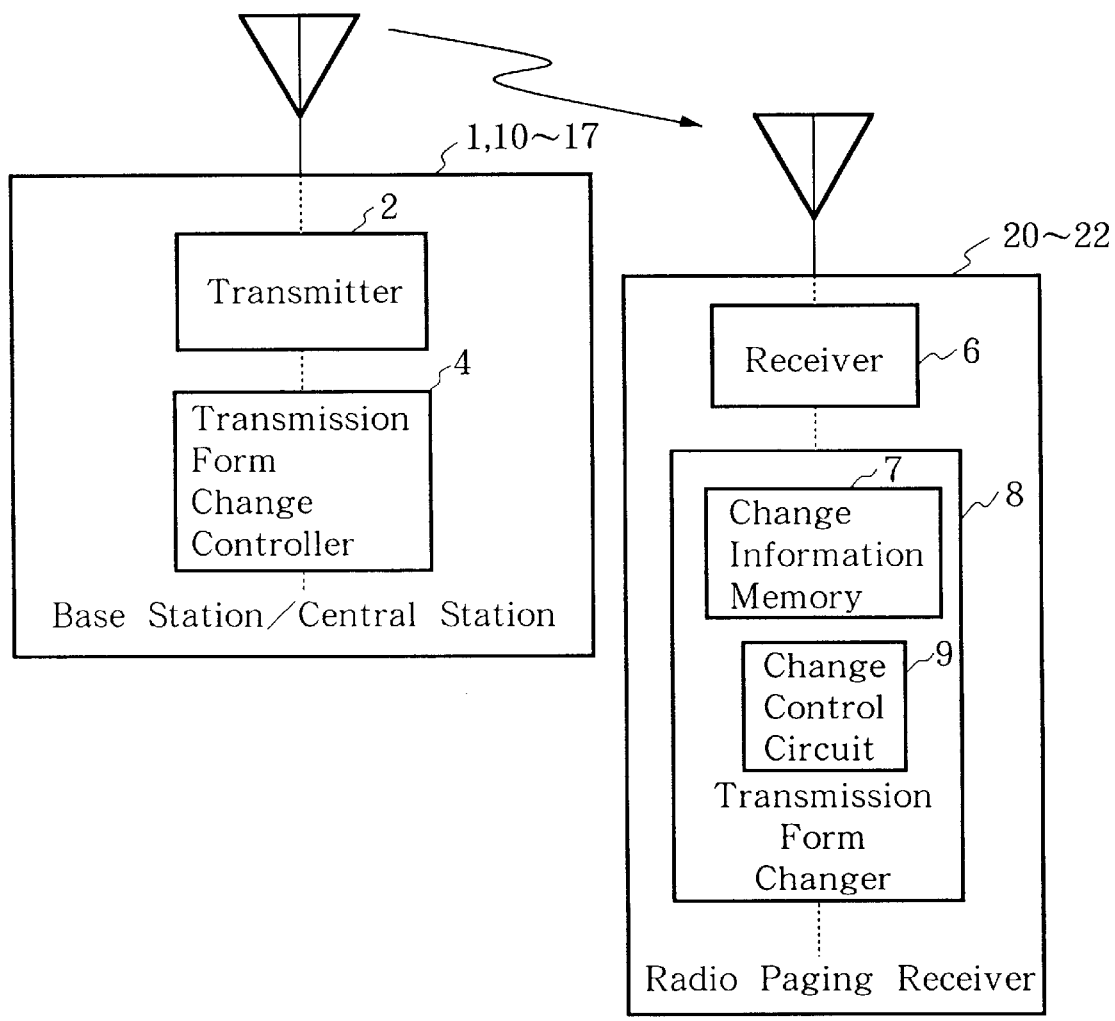
FIG. 1 is a block diagram of a first embodiment of this invention.
Figure 2:
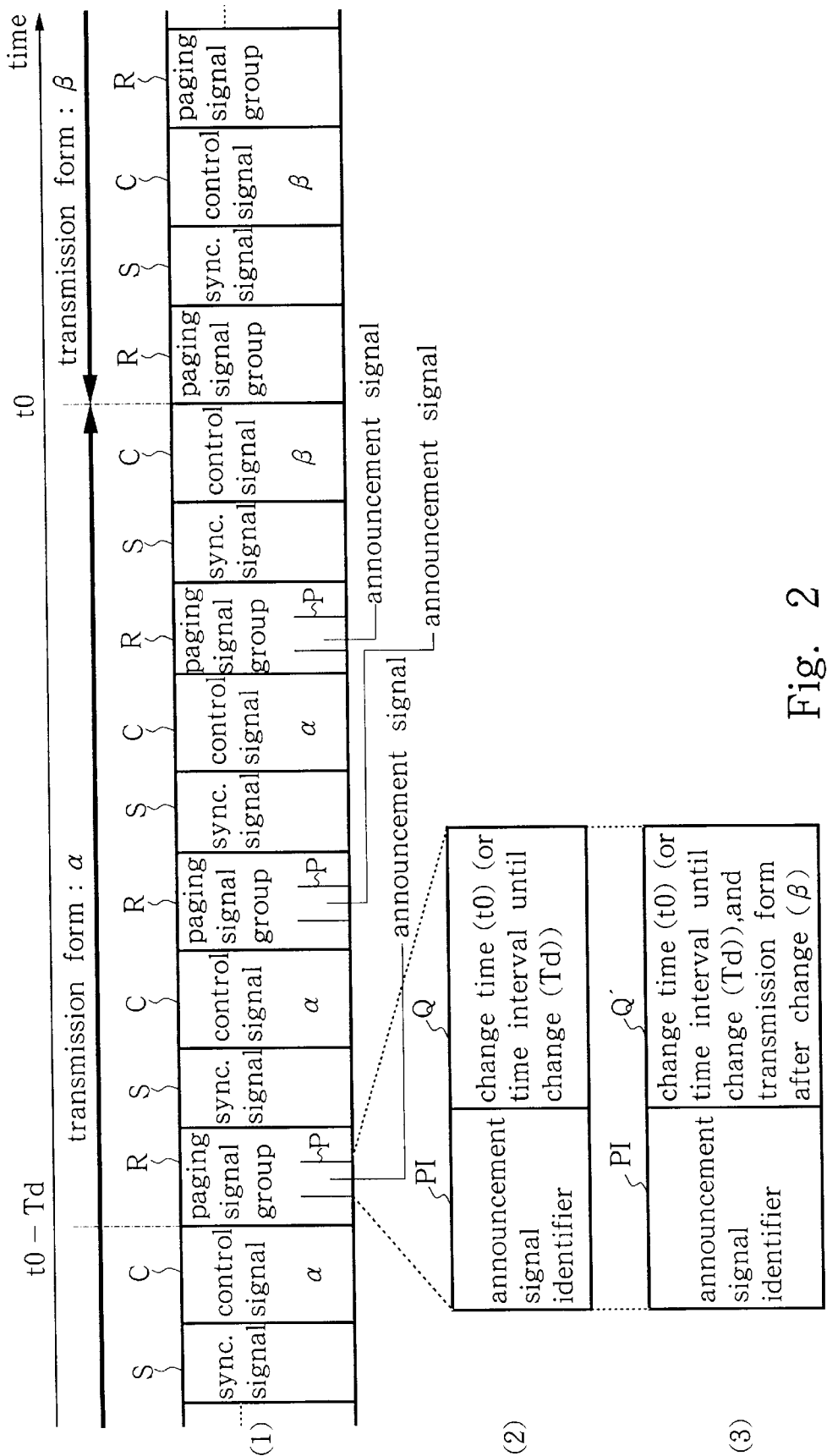
FIG. 2 is a paging signal sequence used in first and second embodiments of this invention.
Figure 15:
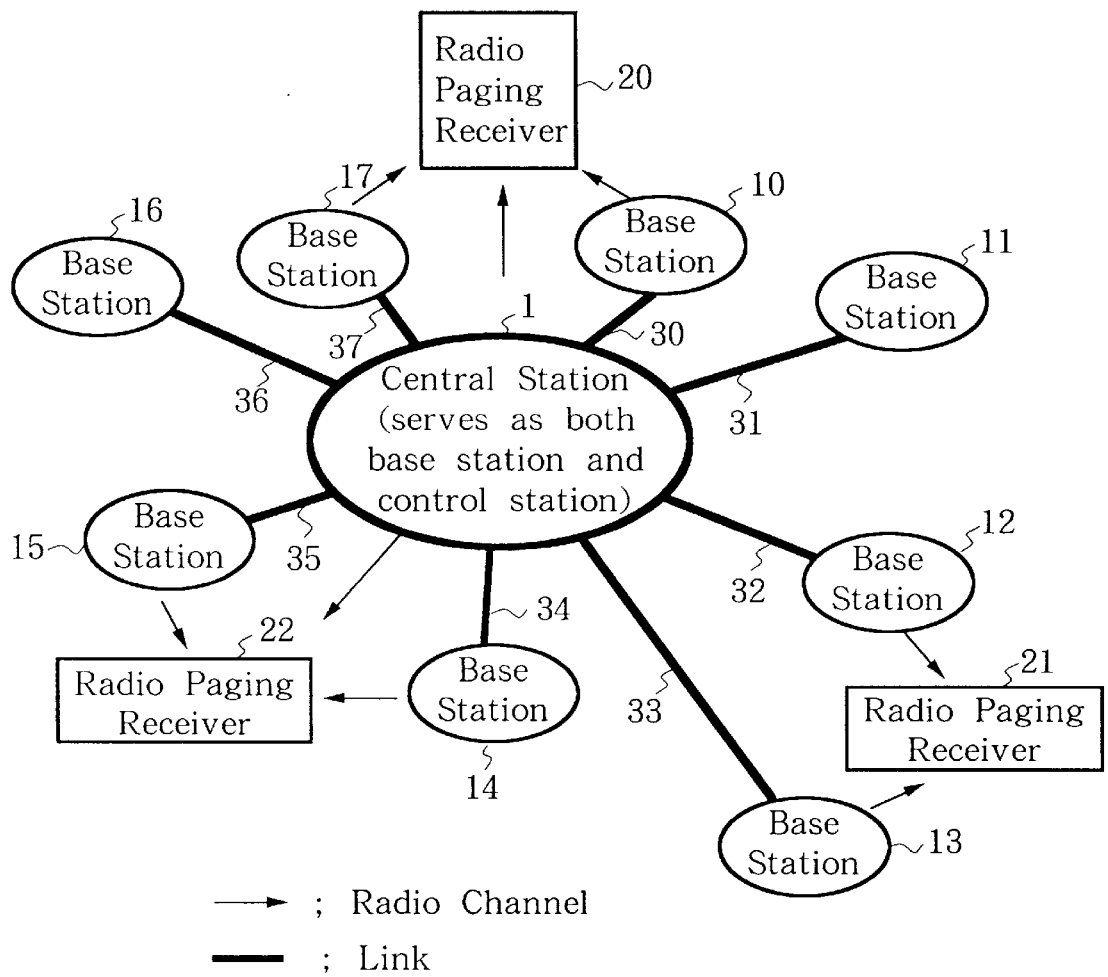
FIG. 15 is a overall constitution of a selective radio paging system.
Figure 16:
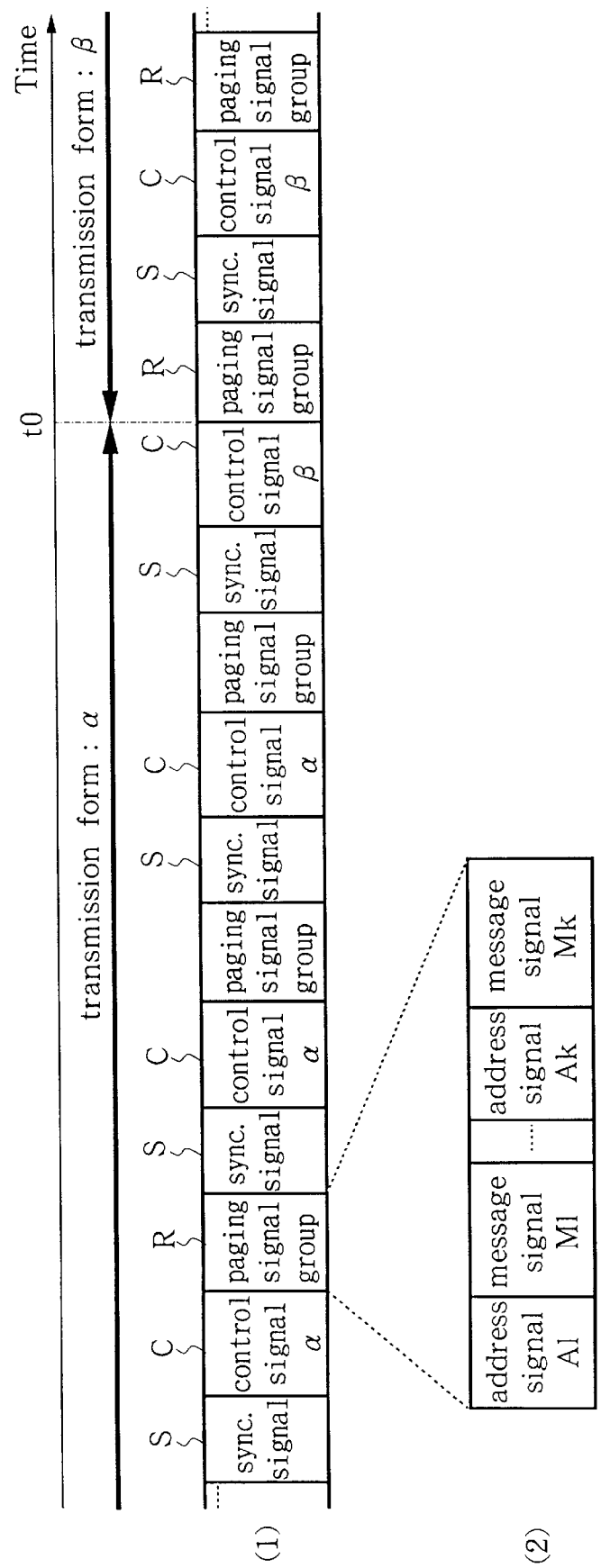
FIG. 16 is a asynchronous format paging signal sequence.
Figure 17:
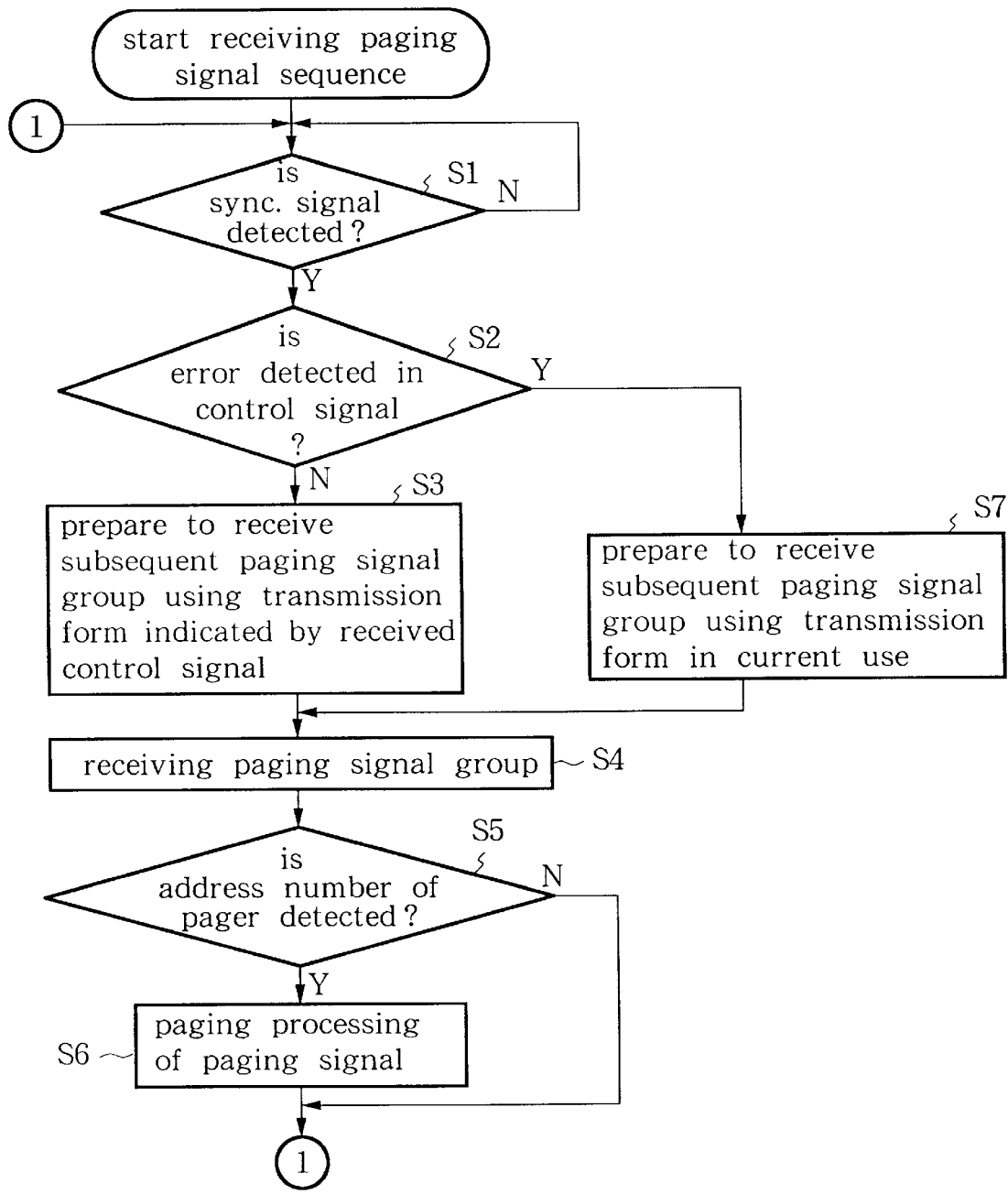
FIG. 17 is a flowchart showing operation of selective radio paging system using asynchronous format paging signal sequences.
Figure 18:
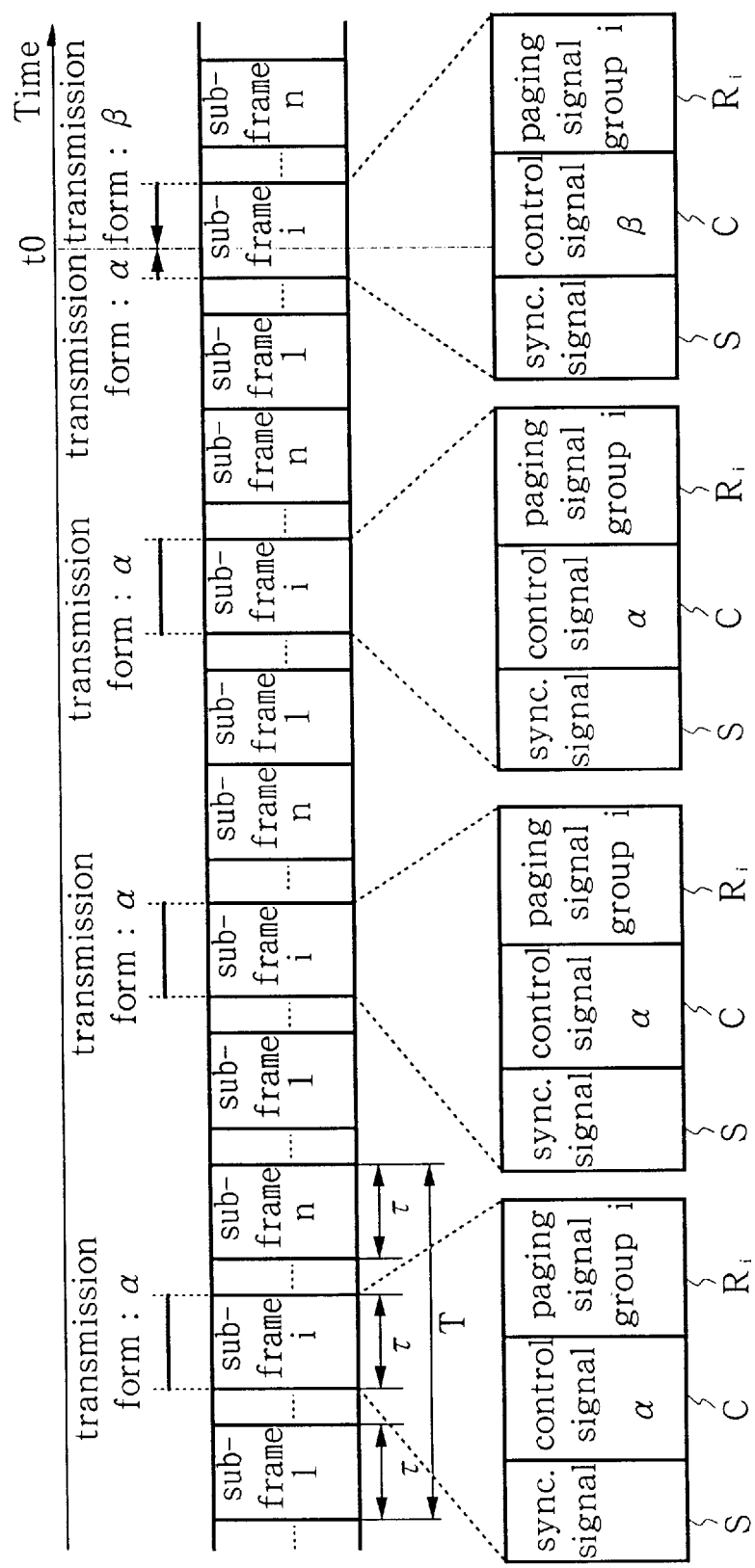
FIG. 18 is a synchronous format paging signal sequence.
Figure 19:
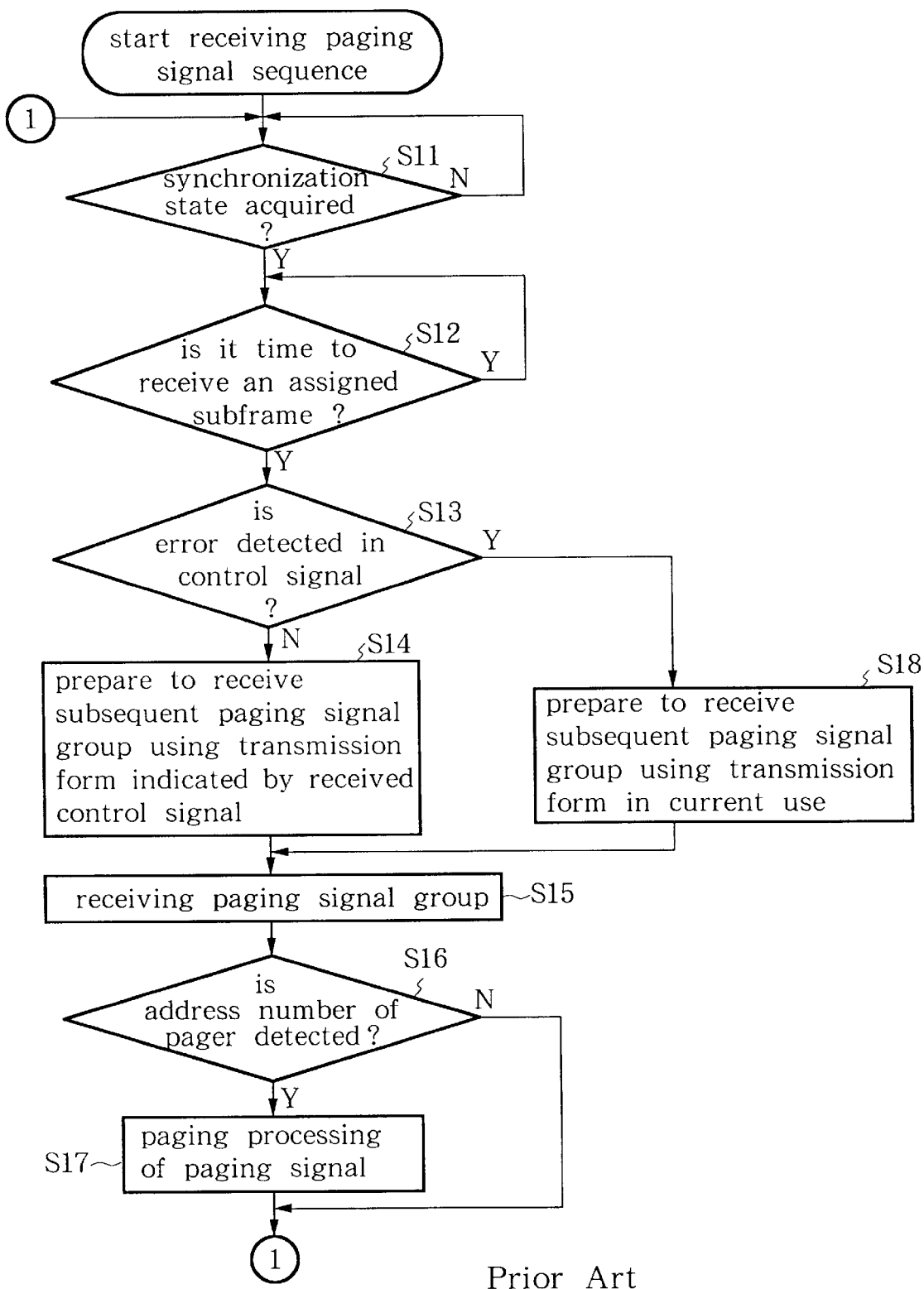
FIG. 19 is a flowchart showing operation of selective radio paging system using synchronous format paging signal sequences.

A first embodiment of this invention will be explained with reference to FIG. 1 and FIG. 2. FIG. 1 is a block diagram of said first embodiment, while FIG. 2 shows the paging signal sequence used in this first embodiment. The first embodiment of this invention is an example of the application of this invention to a selective radio paging system. Reference should be made to FIG. 15 for the overall constitution of a selective radio paging system.

As shown in FIG. 2, this invention is a selective radio paging system which has: base stations 10–17 and central station 1, (see FIG. 1) each of which includes transmitter 2 which serves as a means for transmitting synchronization signals S and control signals C, plus paging signal groups R containing one or more address signals and message signals; and radio paging receivers 20–22, each of which includes receiver 6 which serves as a means which receives these paging signal groups R, detects that its own address signal is contained therein, excites a paging output, and outputs the message signal corresponding to this address signal; wherein base stations 10–17 and central station 1 include, in transmission form change controller 4, a means which transmits while switching among a plurality of transmission forms, and a means which, accompanying this switching, transmits transmission form information which provides notification of the transmission form. The radio paging receivers 20–22 each have transmission form changer 8 which serves as a means which switches to and selects a transmission form suited to the transmission form communicated by means of the aforementioned transmission form information. Although the explanation that will be given of controller 4 in this first embodiment assumes that it is provided in central station 1 and base stations 10–17, it may also be provided in central station 1 only.

An important feature of this invention is that base stations 10–17 and central station 1 have, in transmission form change controller 4, a means which inserts, in paging signal groups R, announcement signals P containing information that gives advance notice of a change of transmission form, the announcement signals P being in addition to control signals C which contain the aforementioned transmission form information, and being inserted prior to the aforementioned change of transmission form. Announcement signals P comprise announcement signal identifier PI and scheduled change time information Q.

Transmission form changer 8 in radio paging receivers 20–22 is provided with: change information memory 7 which serves as a means which receives this announcement signal P and stores the scheduled change time in advance; and change control circuit 9 which serves as a means which, when a control signal C has been received erroneously at this scheduled change time, stops the output of receiver 6 until a control signal C is next received without error.

When transmission form change controller 4 in base stations 10–17 and central station 1 changes the transmission form of paging signal sequences R transmitted after time t0 to "β", as shown in FIG. 2(1), it inserts and transmits an announcement signal P containing information relating to the change time, in paging signal groups R which are transmitted subsequent to a certain time t0-Td prior to time t0, as shown in FIG. 2(2). The information content of announcement signal P is the change time t0.

Figure 3:
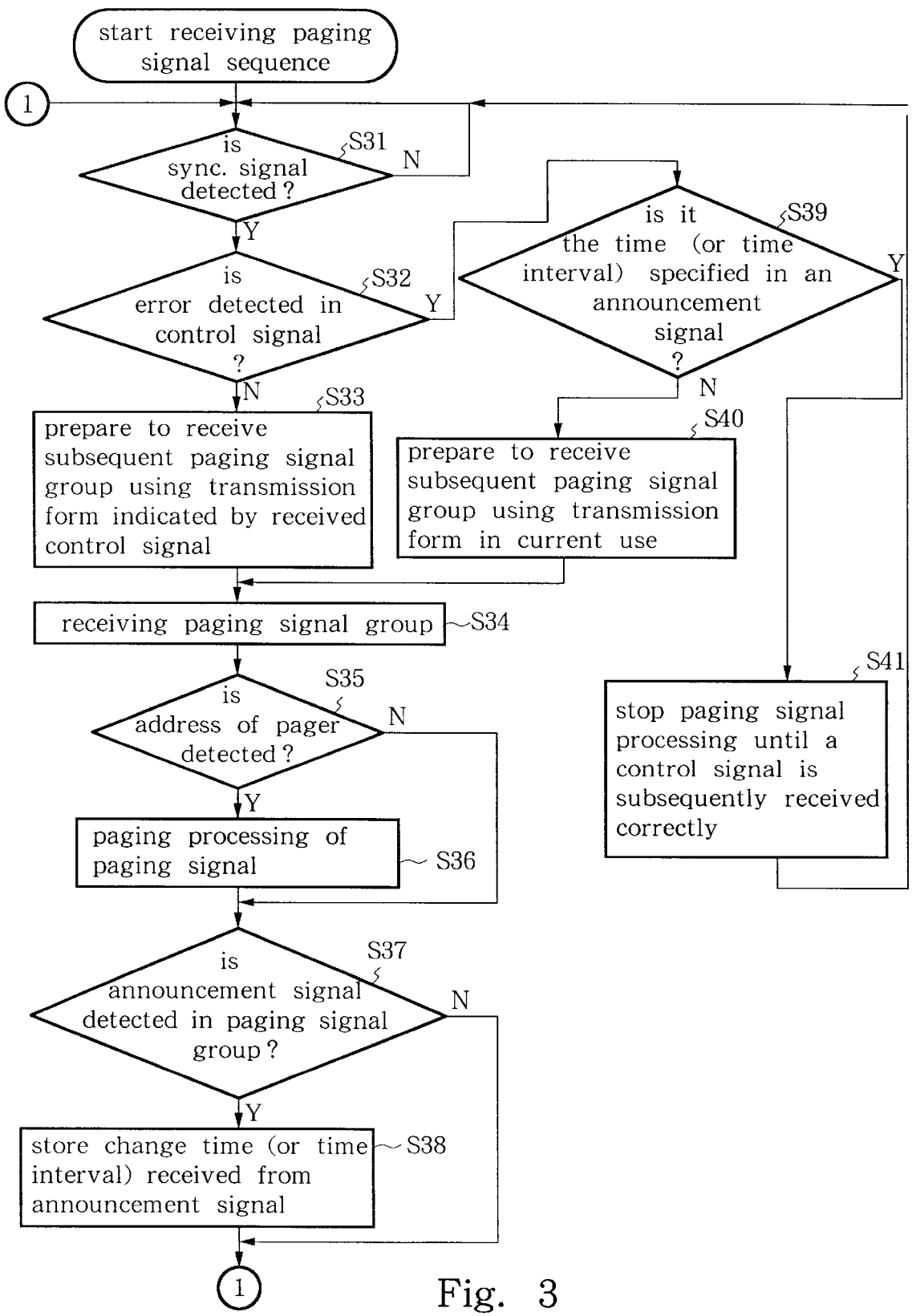
FIG. 3 is a flowchart showing operation of transmission form changer according to first embodiment.

Next, the operation of transmission form changer 8 in this first embodiment of the invention will be explained with reference to FIG. 3, which is a flowchart showing the operation. A synchronization signal S is detected within the received paging signal sequence (S31), and following this, a control signal C is detected. When no error is detected in the received control signal C (S32), preparations are made to receive subsequent paging signal group R on the basis of transmission form "β" indicated by the control signal C (S33). Paging signal group R is then received (S34), and if an address of a radio paging receiver 20–22 (hereinafter, termed "pager" for short) is detected (S35) therein, paging processing of the paging signal is performed (S36). The details of this processing are the same as those already explained in the description of the prior art. If an announcement signal P is detected in paging signal group R (S37), the change time received by means of this announcement signal P is stored in change information memory 7 (S38), where it is kept in readiness for the next change.

When an error has been detected in a control signal C (S32), if it is not the change time that was specified in the previously received announcement signal P (S39), then, because it is clear that there is no change in control signal C, preparations are made to receive subsequent paging signal group R on the basis of the transmission form "α" which is presently being used (S40), whereupon address checking and paging processing are performed. On the other hand, if it is the specified change time (S39), paging signal processing is halted until a subsequent control signal is received correctly (S41). This makes it possible to prevent processing a wrong paging signal due to the use of an inappropriate transmission form. Furthermnore, in cases where only two transmission forms "α" and "β" are used, as in this example, if it is the specified change time, it is also possible to change to the transmission form that is different from the one currently being used, by means of a pager side decision.

Second Embodiment

Figure 4:
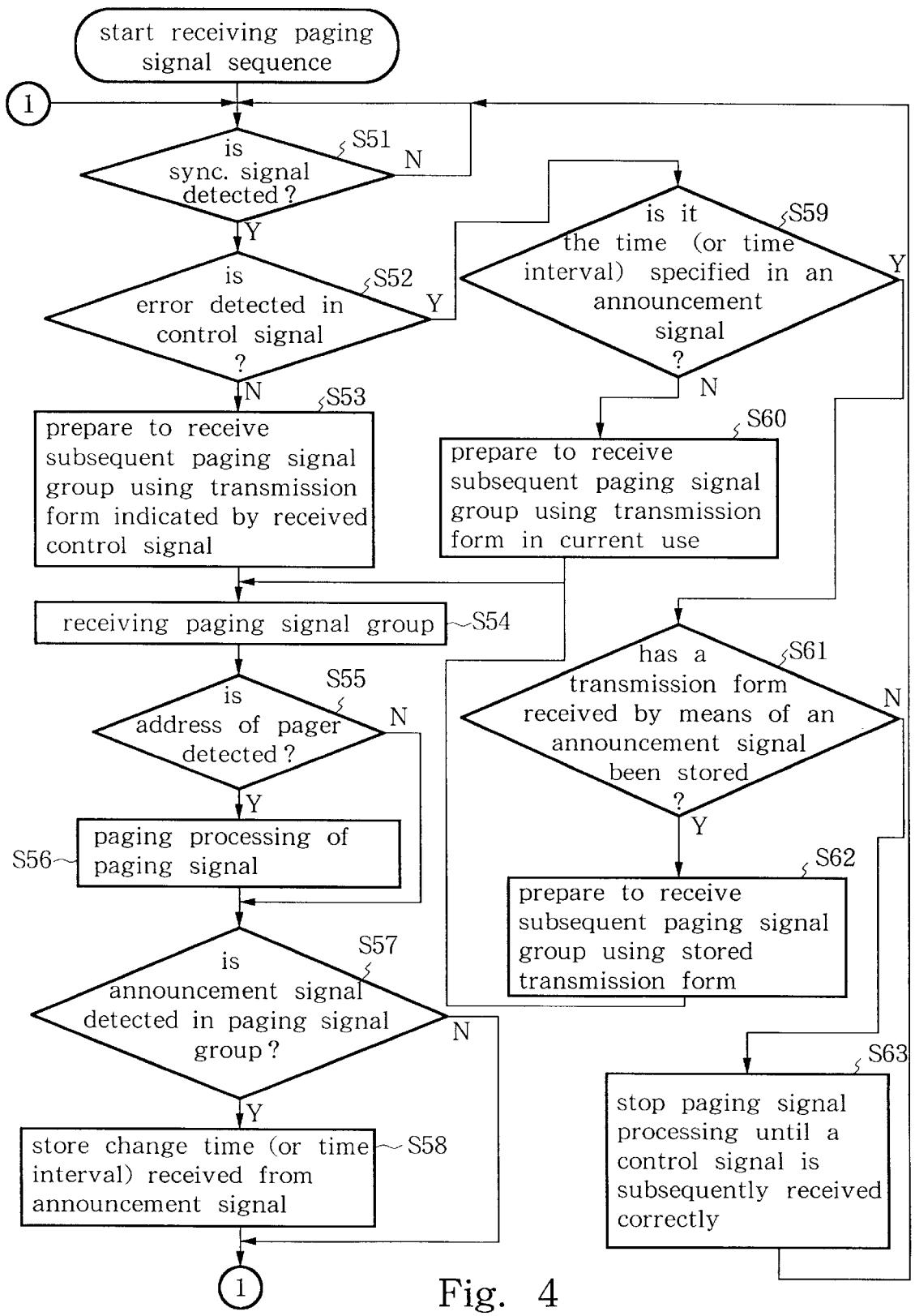
FIG. 4 is a flowchart showing operation of transmission form changer according to second embodiment.

Next, a second embodiment of this invention will be explained with reference to FIG. 2 and FIG. 4. FIG. 2 shows the paging signal sequence used in this second embodiment, while FIG. 4 is a flowchart showing the operation of transmission form changer 8 in this second embodiment. As shown in FIG. 2(3), an important feature of this second embodiment of the invention is that it uses, as the information content of announcement signal P, information Q' containing, in addition to the change time, the transmission form after the change.

The operation of transmission form changer 8 in this second embodiment of the invention will be explained with reference to FIG. 4. As shown in FIG. 4, a synchronization signal S is detected within the received paging signal sequence (S51), and this is followed by a control signal C being detected. If no error is detected in the received control signal C (S52), preparations are made to receive subsequent paging signal group R on the basis of the transmission form indicated by this control signal C (S53). Paging signal group R is then received (S54), and if an address for the pager in question is detected (S55), paging processing of the paging signal is performed (S56). Furthermore, if an announcement signal P is detected within paging signal group R (S57), the change time and transmission form received by means of advance notice signal P are stored in change information memory 7 (S58), where they are held in readiness for the next change.

If an error is detected in control signal C (S52), and if it is not the time specified in the previously received announcement signal P (S59), then, because it is clear that there is no change in control signal C, preparations are made to receive subsequent paging signal group R on the basis of transmission form "α" which is currently in use (S60). On the other hand, if it is the specified change time (S59), and if transmission form "β" which was received by means of an announcement signal P is stored (S61), the transmission form "α" currently being used is changed to the form "β" which was specified in advance notice signal P, and preparations are made to receive the subsequent paging signal group R (S62). If no transmission form for use after the change has been stored (S61), paging signal processing is halted until, subsequently, a control signal C is received correctly (S63). This second embodiment of the invention enables the transmission form subsequent to a scheduled change time to be changed to a previously specified transmission form by means of a decision at the pager side, even when there is a multiplicity of transmission forms.

Third Embodiment

Figure 5:
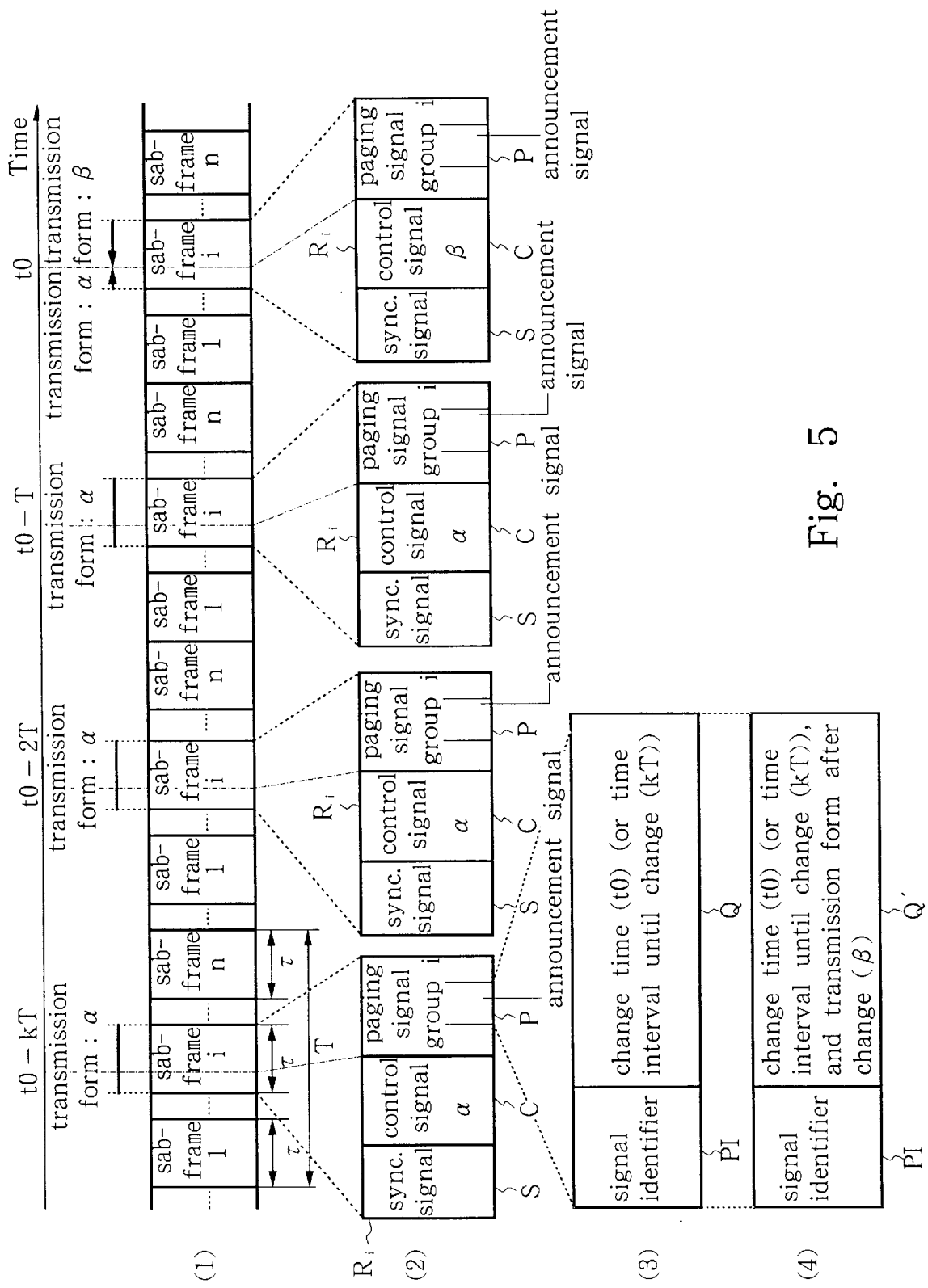
FIG. 5 is a paging signal sequence used in third and fourth embodiments of this invention.

Next, a third embodiment of this invention will be explained with reference to FIG. 5, which shows the paging signal sequence used in this third embodiment. In this third embodiment of the invention, n subframes which are repeatedly received with a period T are employed, and pagers are divided into n groups and subframes respectively assigned thereto. In this third embodiment, a synchronous format paging signal sequence is used so that battery savings can be implemented by means of intermittent receiving wherein a given pager performs receiving operations only during subframes that have been assigned to it. As shown in FIG. 5(1), when base stations 10–17 change the transmission form of paging signal groups in subframes i transmitted at and subsequent to time t0, to "β", then, as shown in FIG. 5(2) and FIG. 5(3), said base stations respectively insert and transmit announcement signals P containing change time information Q, in paging signal groups $R_i$ which are transmitted at and subsequent to time t0-kT prior to time t0. The operation of this third embodiment of the invention can be explained in a similar manner to that of the first embodiment, with the exception that after synchronization has been acquired, a given pager becomes capable of receiving during times when paging signal groups assigned to the pager in question are being received.

Fourth Embodiment

Next, a fourth embodiment of this invention will be explained with reference to FIG. 5, which shows the paging signal sequence used in the embodiment. As shown in FIG. 5(2) and FIG. 5(4), this fourth embodiment employs information Q', which adds, to the change time information Q used in the third embodiment, information relating to the transmission form after the change. The operation of this fourth embodiment can be explained in a similar manner to that of the second embodiment, with the exception that a given pager becomes capable of receiving only during times when paging signal groups assigned to the pager in question are being received.

Fifth Embodiment

Figure 6:
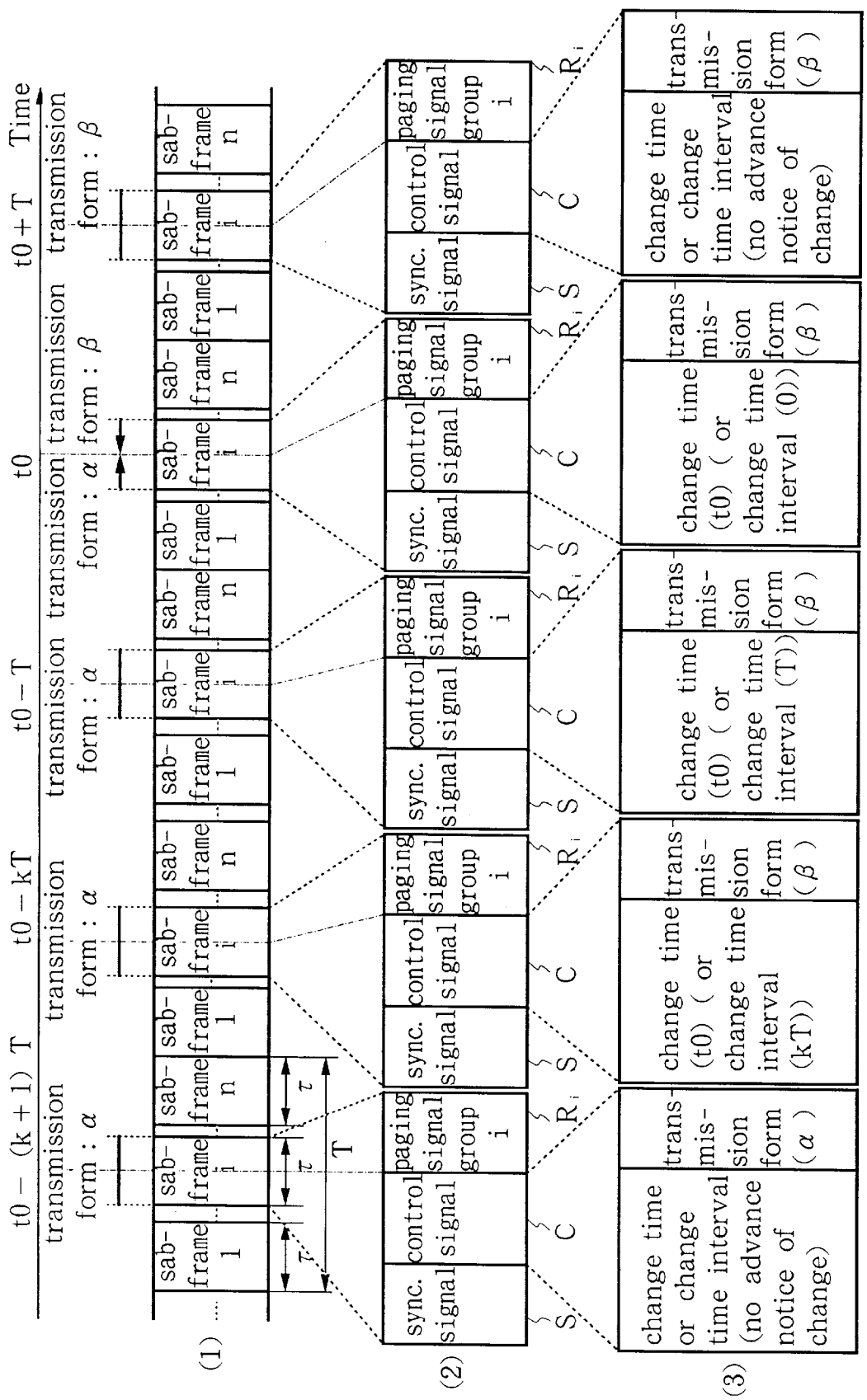
FIG. 6 is a paging signal sequence used in fifth embodiment of this invention.
Figure 7:
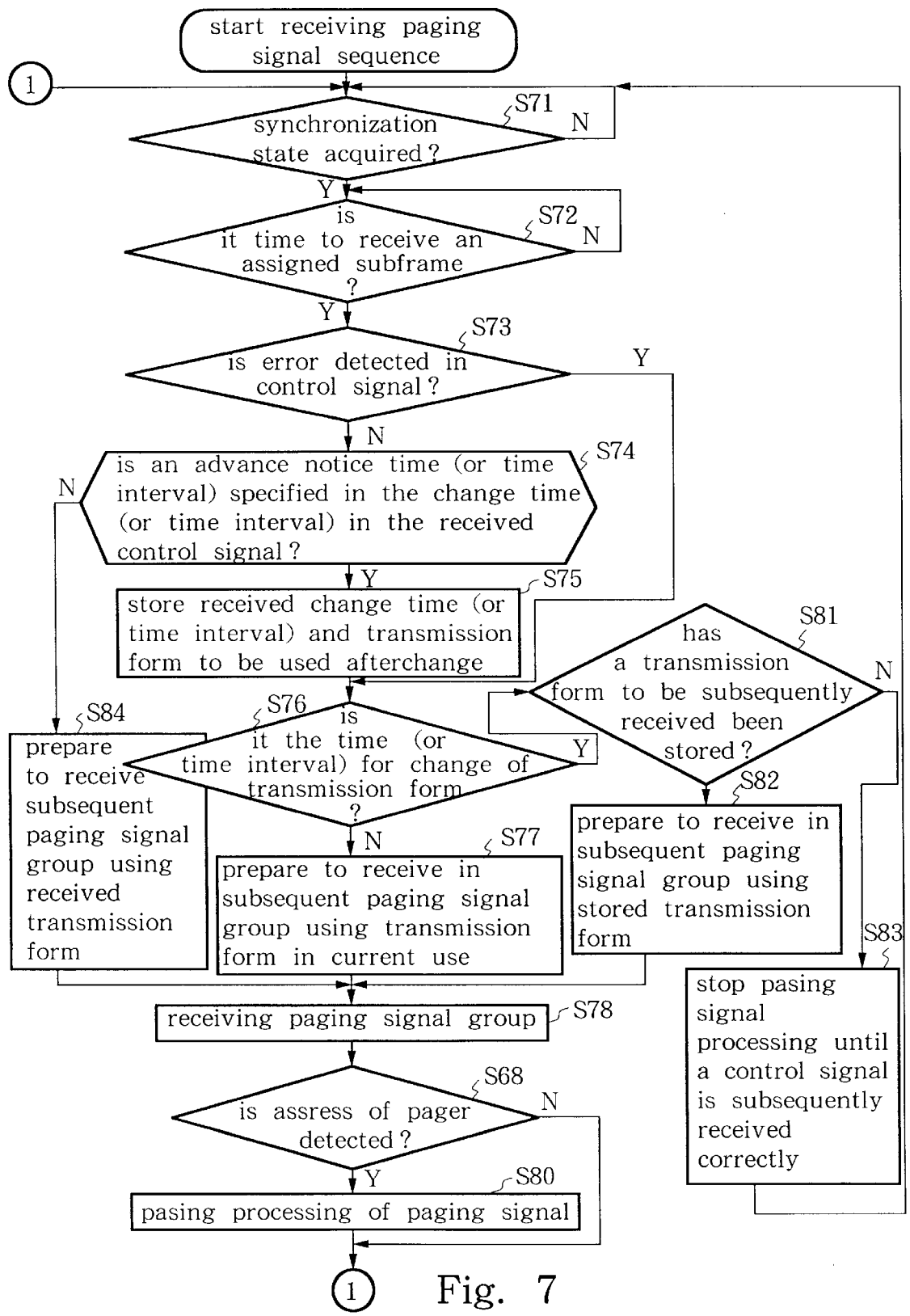
FIG. 7 is a flowchart showing operation of transmission form changer according to fifth embodiment.

Next, a fifth embodiment of this invention will be explained with reference to FIG. 6 and FIG. 7. FIG. 6 shows the paging signal sequence used in this fifth embodiment, while FIG. 7 is a flowchart showing the operation of transmission form changer 8 in this fifth embodiment. In the first to the fourth embodiments of this invention, the information giving advance notice of a change of transmission form was inserted, prior to a change of transmission form, in paging signal groups R or $R_i$, and was separate from control signals C containing the transmission form information. However, in this fifth embodiment of the invention, the transmission form information contained in control signals C is used as the advance notice information concerning a change of transmission form. The application of this fifth embodiment to the synchronous format paging signal sequence given in the third and fourth embodiments will be explained.

As shown in FIG. 6, control signals C contain a change time and a transmission form as their information. A control signal C will sometimes contain information indicating "No advance notice of change", and will sometimes contain change time information. When information indicating "No advance notice of change" is contained, the transmission form information contained in that control signal C will show the transmission form currently being used. When change time information is contained, this indicates that the transmission form given by the transmission form information inserted in that control signal C is scheduled for application, with the change time given by the change time information as the point of change.

As shown in FIG. 6(1), when the transmission form of paging signal groups of subframes i transmitted at and following time t0 is changed from "α" to "β", then, as shown in FIG. 6(2) and FIG. 6(3), at time t0-(k+1)T before time t0, control signals C are transmitted with change time=no change, and transmission form=α, whereas, subsequent to time t0-kT, control signals C are transmitted with change time=t0 and transmission form=β.

As shown in FIG. 7, the operation of transmission form changer 8 is as follows. Namely, after a synchronization signal S—these synchronization signals being received with a period T—has been detected and synchronization has been acquired (S71), the pager becomes capable of receiving only in an assigned subframe (S72). When no error is detected in a received control signal C (S73) and an advance notice time is specified in the change time in this control signal C (S74), the received change time and transmission form after the change are stored (S75). However, when no advance notice time is specified in the change time (S74), preparations are made to receive the following paging signal group $R_i$ using the transmission form of the received control signal (S84). When an error is detected in a control signal C (S73), and if the present time is the change time of the transmission form (S76), it is decided whether or not a transmission form which is subsequently to be received is stored (S81). If one is stored, preparations are made to receive subsequent paging signal group $R_i$ using the stored transmission form (S82). If the present time is not the change time of the transmission form (S76), preparations are made to receive subsequent paging signal group $R_i$ using the transmission form currently in use (S77). If no transmission form which is subsequently to be received is stored, subsequent paging signal processing is halted until a control signal C is received correctly (S83). When preparations can be made to receive in subsequent paging signal group $R_i$, these preparations are carried out and paging signal group $R_i$ following control signal C is received (S78). If the address of the pager in question is detected (S79), paging processing of the paging signal is performed (S80). Although the explanation given here concerns a synchronous format paging signal sequence, a similar explanation could also be given for an asynchronous format paging signal sequence. A decrease in paging signal throughput can be improved by inserting the advance notice signals in control signals C in this way. Similar explanations could also be given for the case where there are two transmission parameters, and where the announcement signals contain only change times (i.e., they do not contain the transmission form after a change).

In the third to the fifth embodiments, the case where a synchronization signal and a control signal are present in every plural number of subframes in the paging signal sequence, and the transmission form is changed in units comprising this plural number of subframes, can be explained in a similar manner, apart from the fact that a pager becomes capable of receiving only in subframes which contain synchronization and control signals, and which have been assigned to the pager in question.

The explanations given in the first to the fifth embodiments of this invention have assumed that there are two transmission forms. However any number of transmission forms can be used. Although information Q and Q' have been explained on the assumption that they contain information relating to the scheduled change time, they could also contain information relating to the time interval until the scheduled change time. Alternatively, equivalent types of information could be used: namely, a frame number corresponding to time t0, or the number of frames from the time an announcement signal P is received until time t0 is reached. There is no particular limit on the number of announcement signals P which are inserted, and although it has been assumed in the first to the fourth embodiments that one is inserted in each paging signal group R or $R_i$, it is by no means essential to send these each time and in every paging signal group R or $R_i$. Conversely, they may also be inserted more frequently.

Sixth Embodiment

Figure 20:
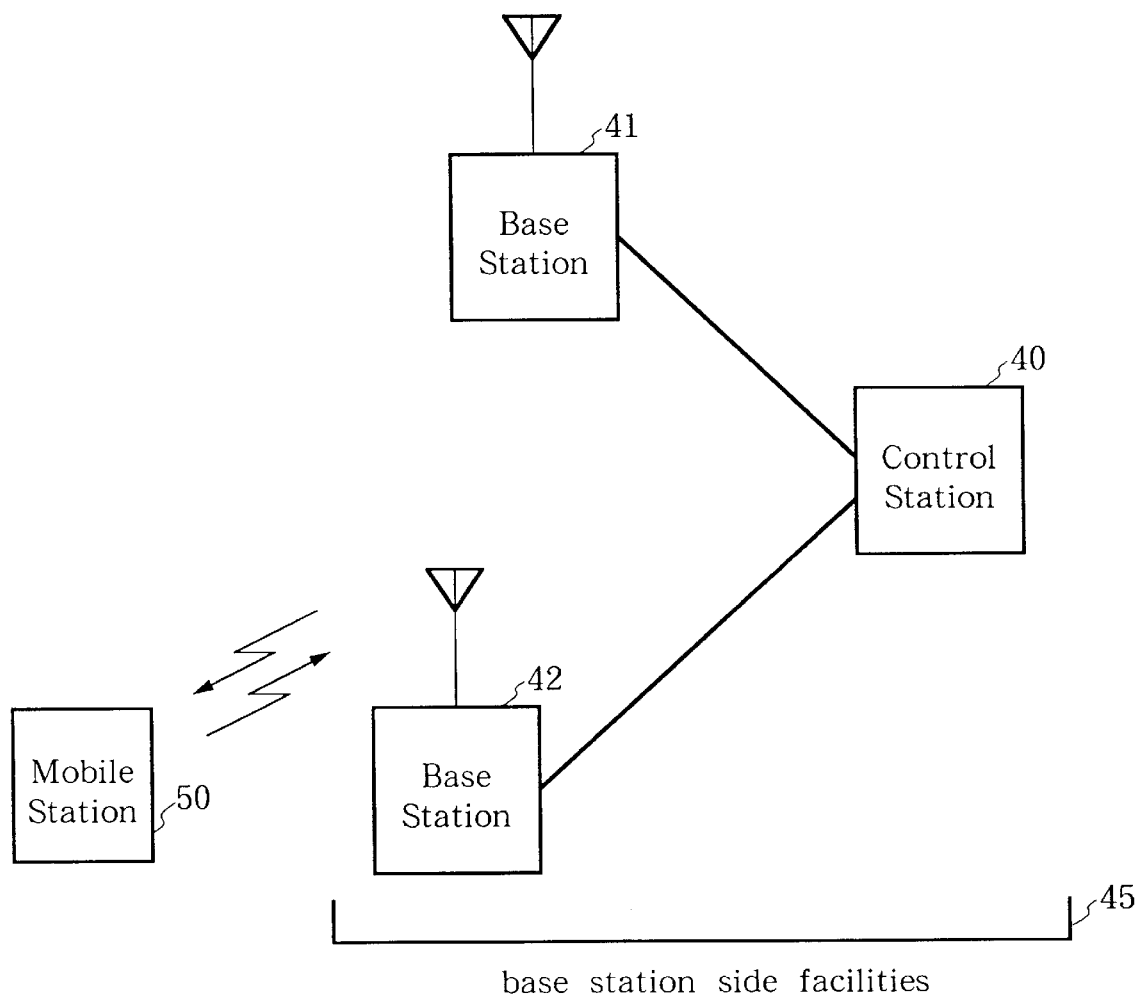
FIG. 20 is a overall constitution of a cellular telecommunication system.
Figure 21:
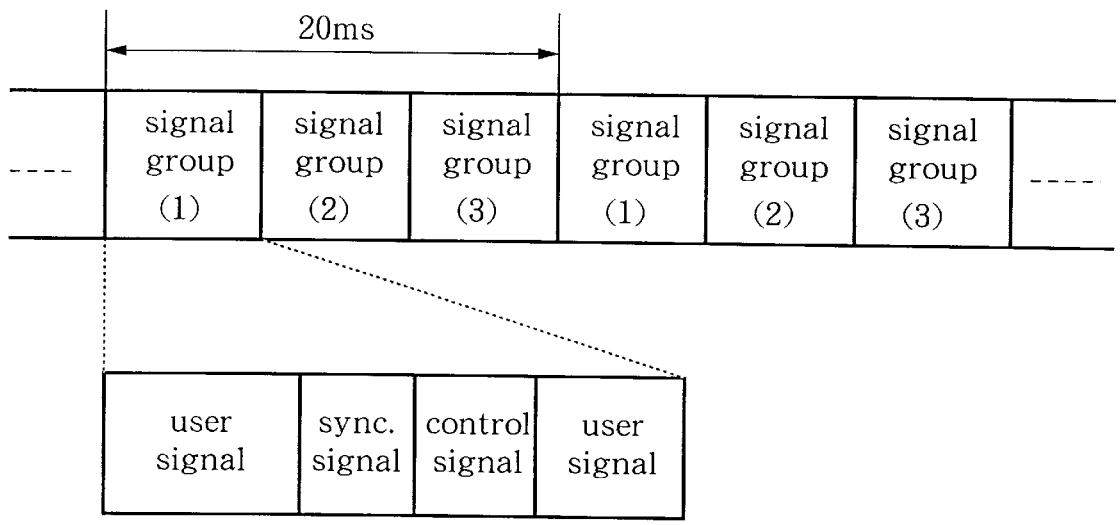
FIG. 21 is a synchronous format of signal sequences transmitted and received at base station and mobile station.
Figure 22:
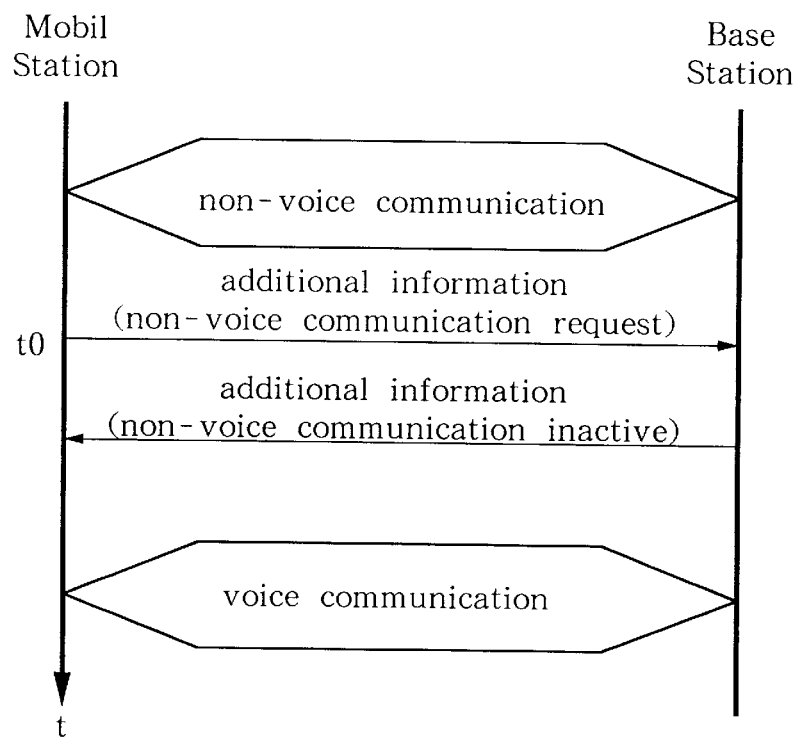
FIG. 22 is a sequence diagram for change from non-voice to voice communication in a prior art example of a cellular telecommunication system.

The constitution of a sixth embodiment of this invention will be explained with reference to FIG. 8, which is a block diagram of a base station and mobile station according to said embodiment. Reference should be made to FIG. 20 for the overall constitution of this embodiment.

This invention is a mobile communications system which has: base stations 41 and 42 or mobile station 50 which include a means which transmits and receives signal groups containing control signals and user signals; and mobile station 50 or base stations 41 and 42 which are connected to base stations 41 and 42 or mobile station 50 by radio communication channels and communicate using signal groups which have been assigned to them. Wherein them. The mobile station 50 comprises transceiver 18 which serves as a means for transmitting and receiving while switching among a plurality of transmission forms. The transmission form change controller 4 which serves as a means, accompanying this switching, transmits and receives control signals containing transmission form information notifies of the transmission form; and wherein base stations 41 and 42 have a transmission form changer 8 which serves as a means which switches to and selects a transmission form suited to the transmission form communicated by the aforementioned transmission form information. In this sixth embodiment of the invention, transmission form changer 8 will be explained on the assumption that it is provided in base stations 41 and 42, but it may also be provided in control station 40 alone.

An important feature of this invention is that mobile station 50 has, in transmission form change controller 4, a means which transmits an announcement signal containing information which gives notice of a change of transmission form in advance of the change.

The aforementioned information which dives advance notice contains information relating to the scheduled change time or to the time interval until the scheduled change time. The transmission form changer 8 has: change information memory 7 which serves as a means which receives the information which gives advance notice and stores the scheduled change time in advance; and change control circuit 9 which serves as a means which, when a control signal has been received erroneously at this scheduled change time, halts the receiving output of transceiver 23 of base stations 41 and 42 until a control signal is next received without error.

Figure 9:
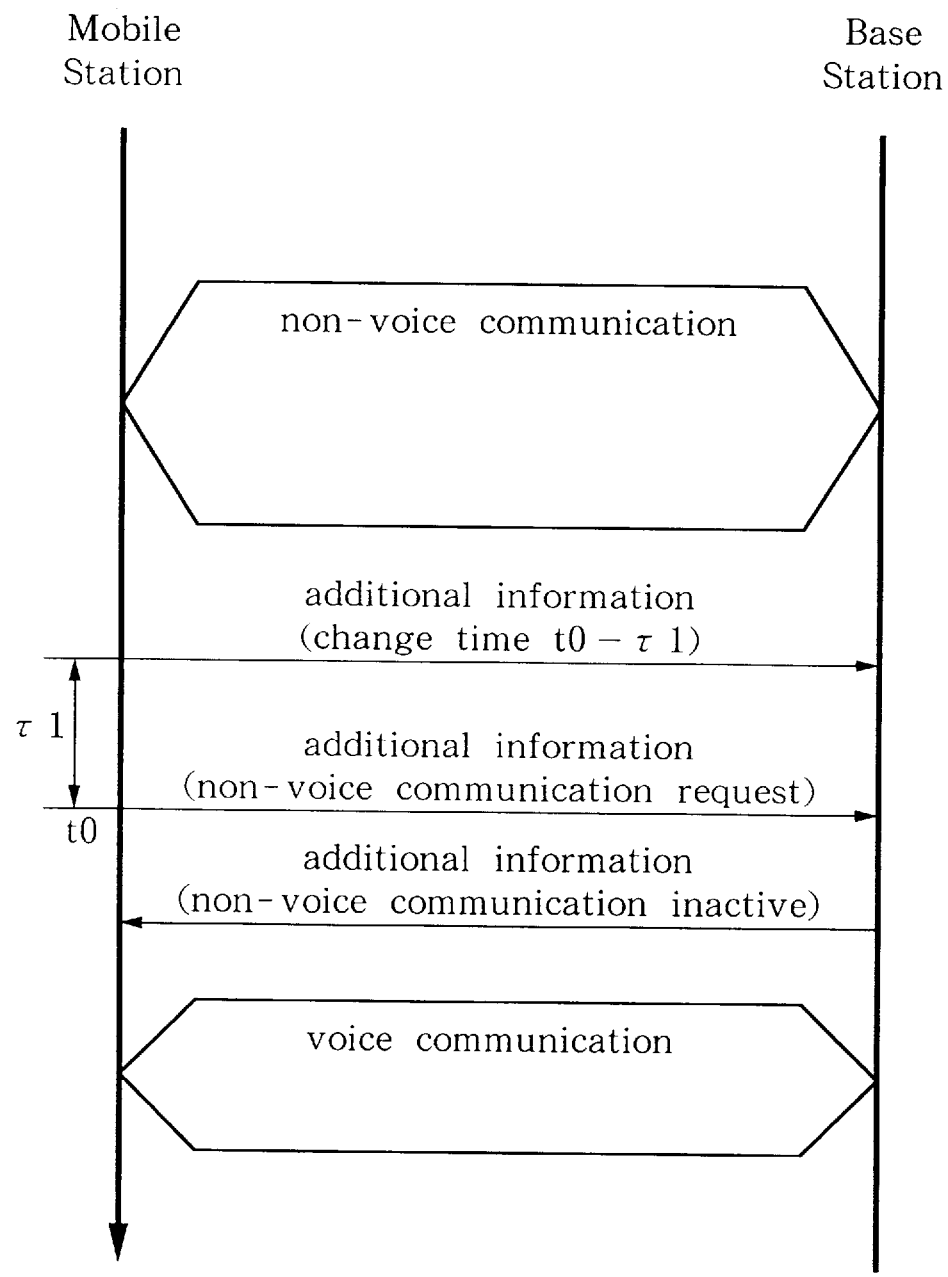
FIG. 9 is a sequence diagram for change from non-voice to voice communication according to the sixth embodiment.
Figure 10:
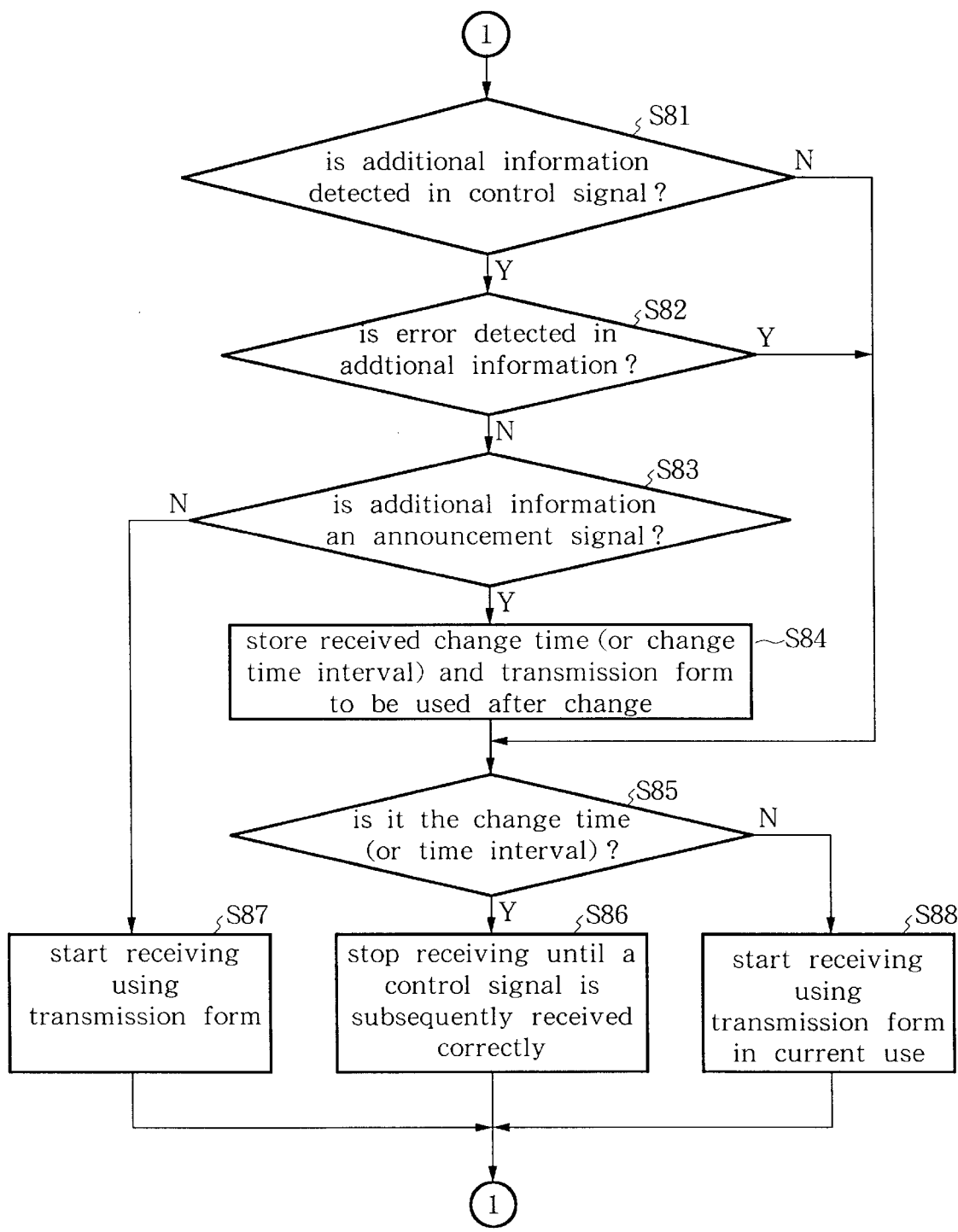
FIG. 10 is a flowchart showing the operation of the sixth embodiment.

Next, the operation of this sixth embodiment of the invention will be explained with reference to FIG. 9 and FIG. 10. FIG. 9 is a sequence diagram for the change from non-voice to voice communication in this sixth embodiment. In this example, the announcement signals are contained in the control signals. FIG. 10 is a flowchart showing the operation of this sixth embodiment. In order to achieve the transmission form switching sequence shown in FIG. 9, the following actions are performed (see FIG. 10). Namely, when additional information is detected in a control signal (S81), error detection is performed on this additional information (S82). When no error is detected, then, if this additional information is not an announcement signal (S83), receiving is started using the transmission form notified by this additional information (S87). If the additional information is an advance notice signal (S83), the change time (or time interval) and transmission form that have been notified by this additional information are stored (S84). Subsequently, when it is the change time (or when the change time interval has elapsed) (S85), receiving is halted until, subsequently, a control signal is received correctly (S86). On the other hand, when it is not the change time (or when the change time interval has not elapsed) (S85), receiving is begun using the transmission form currently in use (S88).

When it has been impossible to detect additional information in a control signal (S81), or when additional information has been detected but an error has been detected in this additional information (S82), then, when it is the change time (or when the change time interval has elapsed) (S85), receiving is halted until a control signal is subsequently received correctly (S86). However, when it is not the change time (or when the change time interval has not elapsed) (S85), receiving is begun using the transmission form in current use. (S88).

This makes it possible to prevent processing a wrong signal due to the use of an inappropriate transmission form. Furthermore, because only two transmission forms are being used: namely, "a transmission form for non-voice communication" or "a transmission form for voice communication", when it is the specified change time, it is also possible to change, by a decision at base stations 41 and 42, to the transmission form that is different from that which has been used up to this time. Because it has been customary to have redundant bits in the additional information (see *Digital Cellular Telecommunication System Standards*, RCR STD-27B), redefining the announcement signal as additional information can easily be achieved.

Seventh Embodiment

Figure 11:
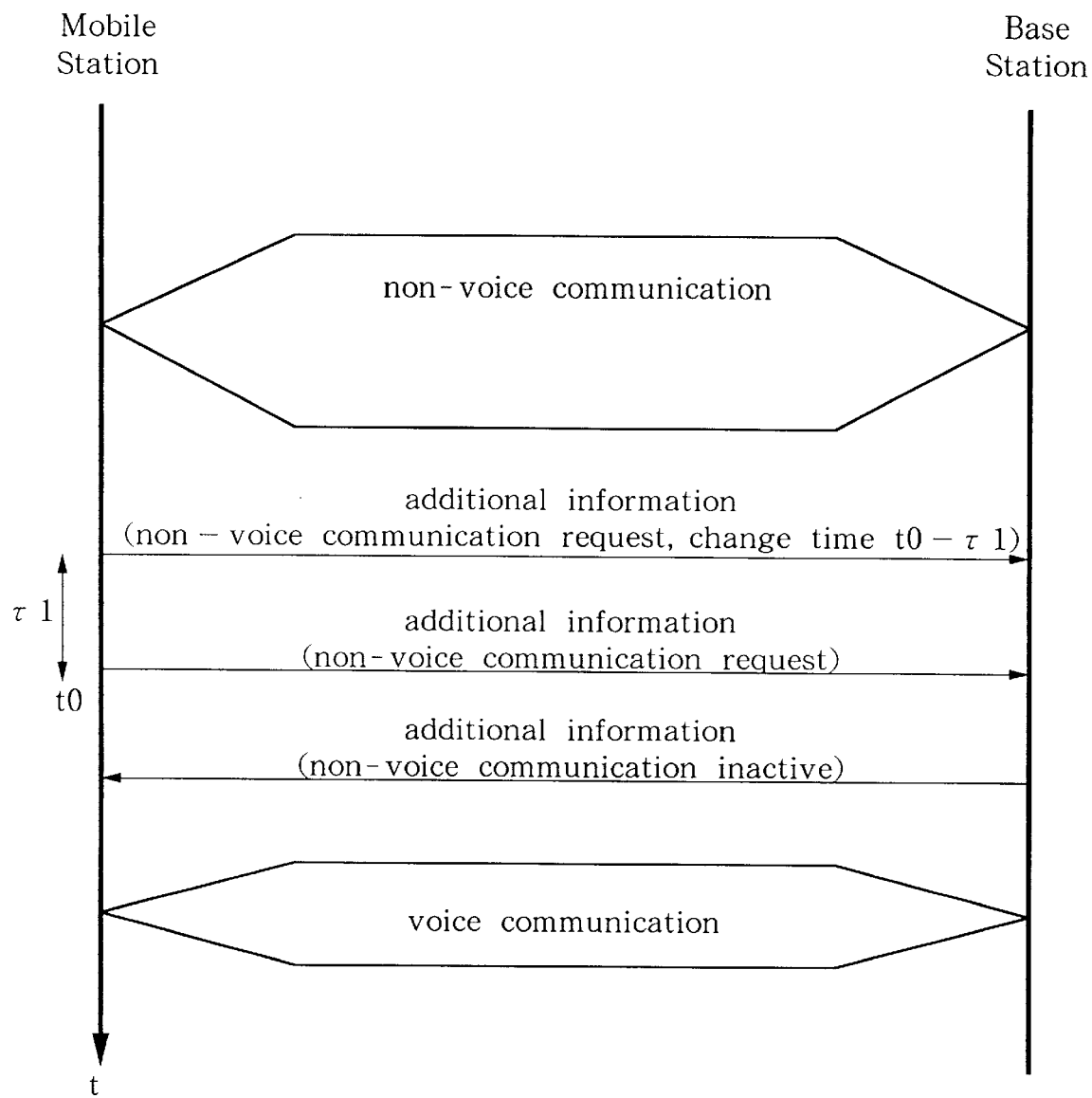
FIG. 11 is a sequence diagram for change from non-voice to voice communication according to a seventh embodiment of this invention.
Figure 12:
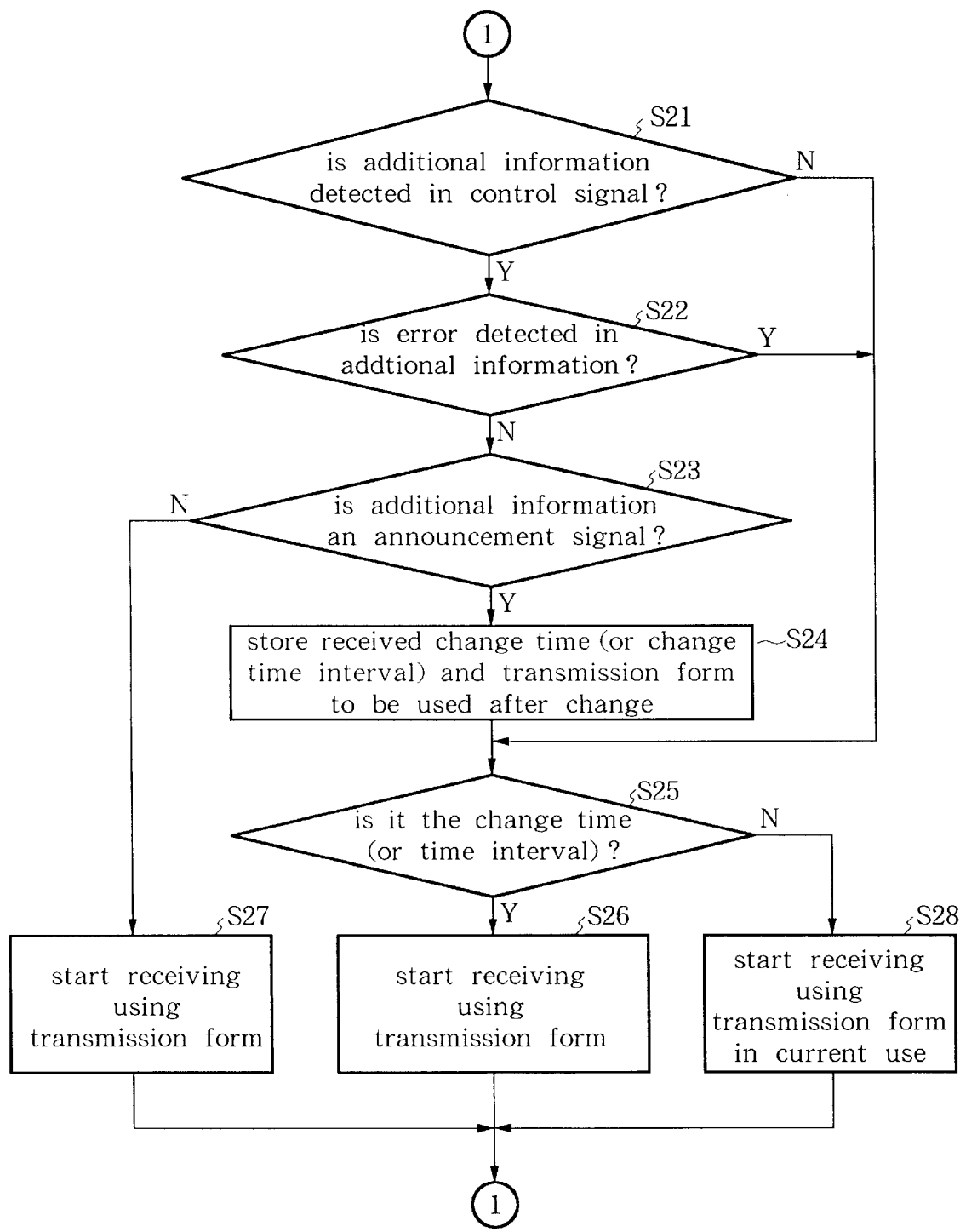
FIG. 12 is a flowchart showing operation of seventh embodiment.

Next, the operation of a seventh embodiment of this invention will be explained with reference to FIG. 11 and FIG. 12. FIG. 11 is a sequence diagram for the change from non-voice to voice communication in this seventh embodiment. In this example, the announcement signals are contained in the control signals. FIG. 12 is a flowchart showing the operation of this seventh embodiment. As described above, mobile station 50 includes, in transmission form change controller 4, a means which, accompanying a change of transmission form, transmits an announcement signal provides notification of the change time (or change time interval) and transmission form; while base stations 41 and 42 include, in transmission form changer 8, a means which stores the change time (or change time interval) and transmission form that have been notified by the aforementioned announcement signal, and a means which changes the transmission form on the basis of these stored contents.

As shown in FIG. 11, when, after non-voice communication is finished, transmission form change controller 4 in mobile station 50 transmits, at time t0, additional information which is a switching request signal (a non-voice communication request), a control signal is used to transmit, at a certain time t0-τ1 directly after the non-voice communication has been completed (and prior to time t0), an advance notice signal which serves as additional information (this additional information comprising a non-voice communication request and a change time (t0-τ1).

FIG. 12 shows the operation of transmission form changer 8 of base stations 41 and 42 which receive the announcement signals shown in FIG. 11. Then additional information is detected in a control signal (S21), error detection of this additional information is performed (S22). If no error is detected, and this additional information is not an advance notice signal (S23), receiving is started using the transmission form that has been notified by means of this additional information (S27). On the other hand, if it is an announcement signal (S23), the change time (or time interval) and transmission form that have been notified by this additional information are stored (S24). After this, when it is the change time (or the change time interval has elapsed) (S25), receiving is started using the stored transmission form (S26). On the other hand, when it is not the change time (or the change time interval has not elapsed) (S25), receiving is started using the transmission form used to date (S28).

If it has been impossible to detect additional information in the control signal (S21), or if additional information has been detected but an error has been detected in this additional information (S22), then, when it is the change time (or the change time interval has elapsed) (S25), receiving is started using the stored transmission form (S26), but if it is not the change time (or the change time interval has not elapsed) (S25), receiving is started using the transmission form that has been used to date (S28).

In this seventh embodiment of the invention, even when there are many transmission forms, it is possible to change the transmission form that follows a scheduled change time to a transmission form that has been specified in advance, by means of a decision at the base station side.

Because it has been customary to have redundant bits in the additional information (see *Digital Cellular Telecommunication System Standards*, RCR STD-27B), redefining the announcement signal as additional information can easily be achieved.

Eighth Embodiment

Figure 13:
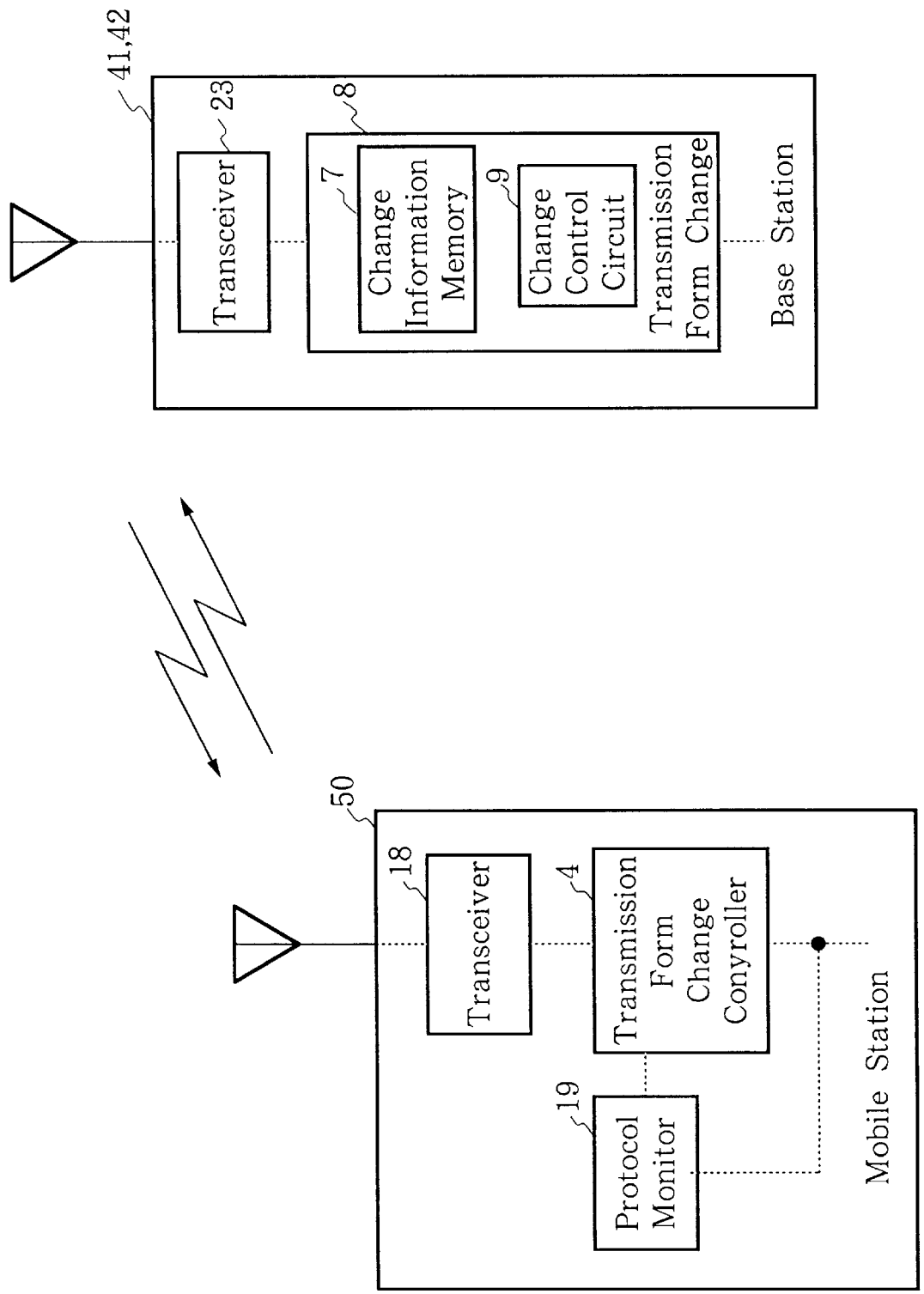
FIG. 13 is a block diagram of an eighth embodiment of this invention.
Figure 14:
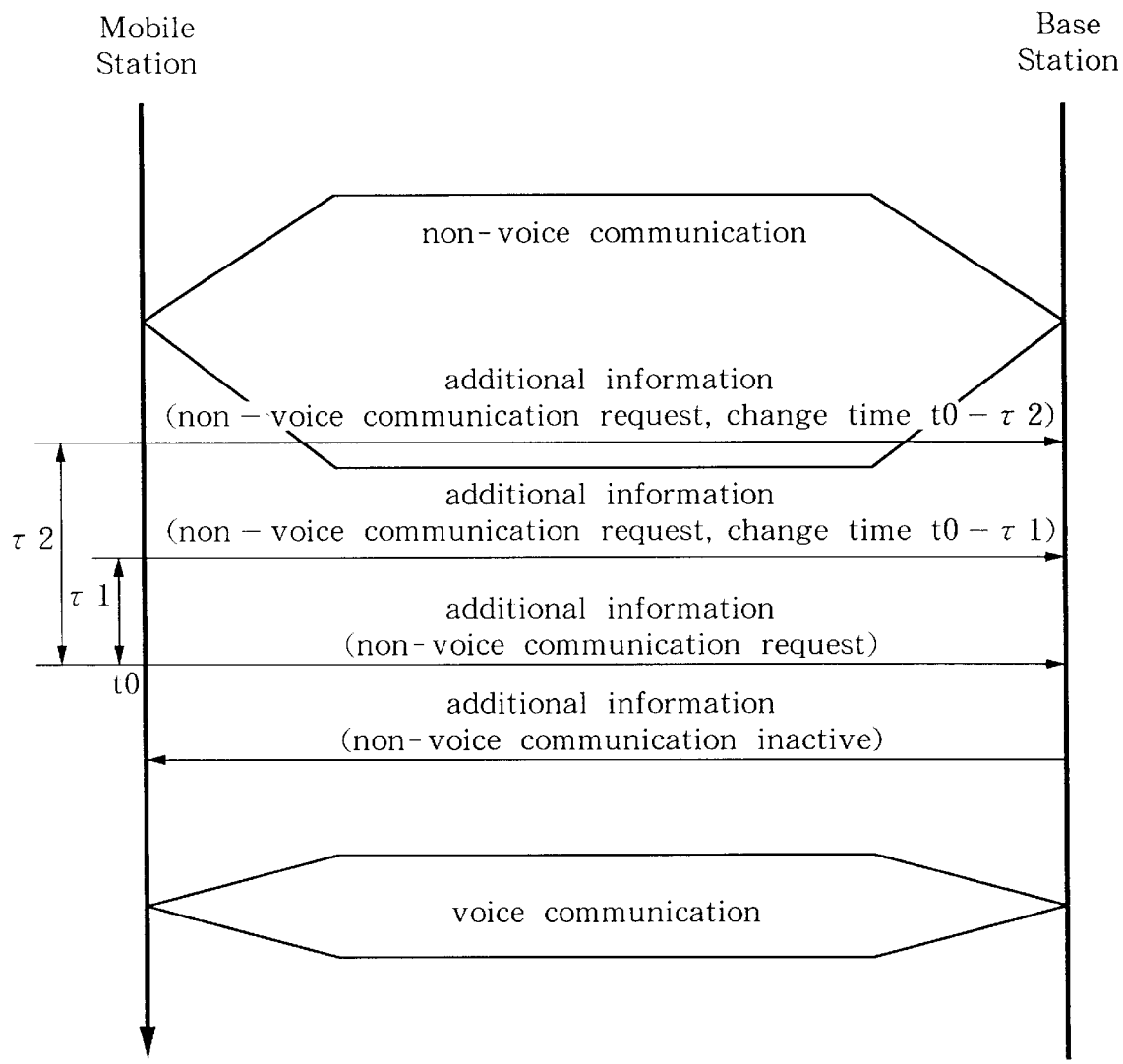
FIG. 14 is a sequence diagram showing operation of eighth embodiment.

Next, an eighth embodiment of this invention will be explained with reference to FIG. 13 and FIG. 14. FIG. 13 is a block diagram of this eighth embodiment, while FIG. 14 is a sequence diagram showing the operation of said embodiment. In the seventh embodiment of this invention, mobile station 50 transmits an announcement signal after the completion of non-voice communication, and therefore when numerous announcement signals are transmitted, the time required to change from non-voice to voice communication becomes rather long. If the number of announcement signals transmitted is reduced, then although the time required to change from non-voice to voice communication becomes shorter, the transmission quality of these announcement signals deteriorates.

As shown in FIG. 13, it is an important feature that mobile station 50 has protocol monitor 19 which monitors non-voice signals. This protocol monitor 19 decides that the non-voice communication has nearly finished, and provides notification to the transmission form change controller 4 of this. By way of example, an explanation will be given of the case where, in the course of a G3 facsimile communication, mobile station 50 transmits a facsimile image signal. When the G3 facsimile transmission is completed, mobile station 50 transmits a DCN signal, which is a G3 facsimile protocol. (In this case, the mobil stations will also transmit additional information (a G3 FAX communication request)). The soonest this DCN signal is transmitted is approximately 2.0 seconds after mobile station 50 has transmitted an BOP signal (see *Digital Cellular Telecommunication System Standards*, RCR STD-27B/ITU recommendation, T30). It therefore becomes possible to inform transmission form change controller 4 that the G3 facsimile communication has neared its end, by using protocol monitor 19 to detect the transmission of this EOP signal by mobile station 50. Transmission form change controller 4 can then transmit an announcement signal on the basis of this.

As shown in FIG. 14, when, after a non-voice communication has been completed, transmission form change controller 4 of mobile station 50 transmits, at time t0, additional information which is a switching request signal (a non-voice communication request), a control signal can be used to transmit, starting from a certain time t0-τ2 before non-voice communication ends, an announcement signal which serves as additional information (this additional information comprising a non-voice communication request and a change time t0-τ2). This enables a large number of announcement signals to be transmitted without lengthening the time required to change from non-voice to voice communication. No explanation need be given of the constitution and operation of base stations 41 and 42, since they are the same as in the sixth embodiment.

In the sixth to the eight embodiments of this invention, the announcement signals were explained as being transmitted from mobile station 50 to base stations 41 and 42, but similar explanations could be given even if the positions of mobile station 50 and base stations 41 and 42 were transposed.

The explanations given in the sixth to the eighth embodiments of this invention assumed that information relating to change time is included as the content of the announcement signals, but similar explanations could be given for the case where information relating to the time interval until the change time is included.

Figure 8:
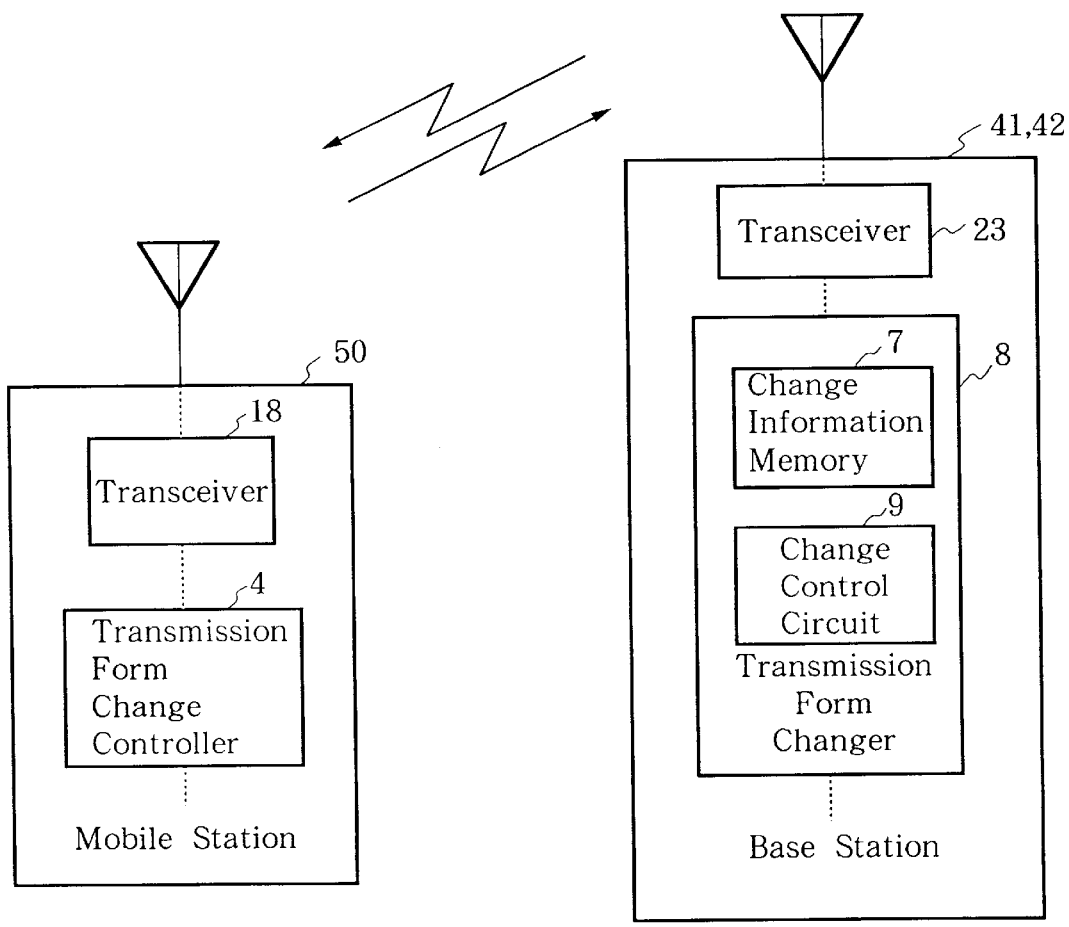
FIG. 8 is a block diagram of a sixth embodiment of this invention.

Furthermore, the explanations given in the sixth to the eighth embodiments of this invention assumed that base stations 41 and 42 and mobile station 50 depicted in FIG. 8 and FIG. 13 are constituted in such manner that mobile station 50 has transmission form change controller 4, while base stations 41 and 42 have transmission form changer 8. However, similar explanations could be given even if it were assumed that mobile station 50 has transmission form changer 8 and base stations 41 and 42 have transmission form change controller 4.

The explanations given in the sixth to the eighth embodiments of this invention were for the case where the announcement signals are contained in the control signals, but similar explanations could be given for the case where the announcement signals are contained in the user signals.

We claim:

1. A selective radio paging system comprising:
   a base station including a means for transmitting a paging signal sequence containing control signals and one or more address signals; and
   a radio paging receiver including a means for receiving the paging signal sequence, detecting whether its own address signal is contained therein, and exciting a paging output:
   wherein the base station comprises:
      a means for transmitting while switching among a plurality of transmission parameters or transmission modes; and
      a means for, accompanying the switching, transmitting control signals containing transmission form information which provides notification of the transmission parameters or transmission modes:
   the radio paging receiver includes a means for switching to and selecting transmission parameters or transmission modes that are suited to the transmission parameters or transmission modes that are communicated by means of the transmission form information:
   the base station includes a means for transmitting announcement signals which give advance notice of a change of the transmission parameters or transmission modes in advance of said change; and
   the advance notice contains information relating to a scheduled change time or to a time interval until the scheduled change time.

2. A selective radio paging system as set forth in claim 1, wherein the means for switching and selecting includes:
   a means for receiving the advance notice information and storing the scheduled change time in advance, and a means for, when a control signal has been received erroneously at the scheduled change time, stopping the output of the receiver until a control signal is next received without error.

3. A selective radio paging system comprising:
   a base station including a means for transmitting a paging signal sequence containing control signals and one or more address signals; and
   a radio paging receiver including a means for receiving the paging signal sequence, detecting whether its own address signal is contained therein, and exciting a paging output;
   wherein the base station comprises:
      a means for transmitting while switching among a plurality of transmission parameters or transmission modes; and
      a means for, accompanying the switching, transmitting control signals containing transmission form information which provides notification of the transmission parameters or transmission modes;
   the radio paging receiver includes a means for switching to and selecting transmission parameters or transmission modes that are suited to the transmission parameters or transmission modes that are communicated by means of the transmission form information:
   the base station includes a means for transmitting announcement signals which give advance notice information of a change of the transmission parameters or transmission modes in advance of said change; and
   when there are two transmission parameters or transmission modes (α and β):
      the means for switching and selecting includes:
         a means for receiving the advance notice information and storing a scheduled change time in advance; and
         a means, for when a control signal has been received erroneously at the scheduled change time, switching to and selecting transmission parameters or transmission modes suited to one transmission parameter or transmission mode (β) instead of transmission parameters or transmission modes which are suited to the transmission parameter or transmission mode (α) which have been in use up to the scheduled changed time.

4. A selective radio paging system comprising:
   a base station including a means for transmitting a paging signal sequence containing control signals and one or more address signals; and
   a radio paging receiver including a means for receiving the paging signal sequence, detecting whether its own address signal is contained therein, and exciting a paging output;

wherein the base station comprises:
a means for transmitting while switching among a plurality of transmission parameters or transmission modes, and
a means for, accompanying the switching, transmitting control signals containing transmission form information which provides notification of the transmission parameters or transmission modes;
the radio paging receiver includes a means for switching to and selecting transmission parameters or transmission modes that are suited to the transmission parameters or transmission modes that are communicated by means of the transmission form information;
the base station includes a means for transmitting announcement signals which give advance notice information of a change of the transmission parameters or transmission modes in advance of said change; and the signals which gives advance notice information contains information relating to a scheduled change time or a interval until the scheduled change time, and information relating to the transmission parameters or transmission modes after the change.

5. A selective radio paging system as set forth in claim 4, wherein the means for switching and selecting includes:
a means for receiving the advance notice information and storing the advance notice information relating to the scheduled change time and to the transmission parameters or transmission modes after the change; and
a means for, when one of said control signals has been received erroneously at the scheduled change time, switching to and selecting the transmission parameters or transmission modes in accordance with the information relating to the transmission parameters or transmission modes after the change, which has been stored in the storing means.

6. A cellular telecommunication system comprising:
a base station or a mobile station which includes a means for transmitting and receiving signal sequences containing control signals and user signals; and
a mobile station or a base station connected to the base station or mobile station by radio communication channels;
wherein the base station or mobile station includes:
a means for transmitting and receiving while switching among a plurality of transmission parameters or transmission modes; and
a means for, accompanying this switching, transmitting and receiving control signals containing transmission form information that provides notification of the transmission parameters or transmission modes;
the mobile station or base station includes a means for switching to and selecting transmission parameters or transmission modes suited to the transmission parameters or transmission modes communicated by the transmission form information;
the base station or mobile station includes a means for transmitting announcement signals which give advance notice of a change of the transmission parameters or transmission modes in advance of said change; and the signals which gives advance notice contains information relating to a scheduled change time or to a time interval until the scheduled change time.

7. A cellular telecommunication system as set forth in claim 6, wherein the means for switching and selecting includes:
a means for receiving the advance notice information and storing in advance the scheduled change time; and
a means for, when one of said control signals has been received erroneously at the scheduled change time, stopping the output of the receiving means of the base station or mobile station until one of said control signals is next received without error.

8. A cellular telecommunication system comprising:
a base station or a mobile station which includes a means for transmitting and receiving signal sequences containing control signals and user signals; and
a mobile station or a base station connected to the base station or mobile station by radio communication channels;
wherein the base station or mobile station includes:
a means for transmitting and receiving while switching among a plurality of transmission parameters or transmission modes; and
a means for, accompanying this switching, transmitting and receiving control signals containing transmission form information that provides notification of the transmission parameters or transmission modes;
the mobile station or base station includes a means for switching to and selecting transmission parameters or transmission modes suited to the transmission parameters or transmission modes communicated by the transmission form information;
the base station or mobile station includes a means for transmitting announcement signals which give advance notice information of a change of the transmission parameters or transmission modes in advance of said change; and
when there are two transmission parameters or transmission modes ($\alpha$ and $\beta$):
the means for switching and selecting includes:
a means which receives the advance notice information and storing a scheduled change time in advance; and
a means for when one of said control signals has been received erroneously at the scheduled change time, switching to and selecting transmission parameters or transmission modes suited to one transmission parameter or transmission mode ($\beta$) instead of transmission parameters or transmission modes suited to the transmission parameter or transmission mode ($\alpha$) which have been in use up to the scheduled change time.

9. A cellular telecommunication system comprising:
a base station or a mobile station which includes a means for transmitting and receiving signal sequences containing control signals and user signals; and
a mobile station or a base station connected to the base station or mobile station by radio communication channels;
wherein the base station or mobile station includes:
a means for transmitting and receiving while switching among a plurality of transmission parameters or transmission modes; and
a means for, accompanying this switching, transmitting and receiving control signals containing transmission form information that provides notification of the transmission parameters or transmission modes;
the mobile station or base station includes a means for switching to and selecting transmission parameters or transmission modes suited to the transmission parameters or transmission modes communicated by the transmission form information;

the base station or mobile station includes a means for transmitting announcement signals which give advance notice of a change of the transmission parameters or transmission modes in advance of said change; and the signals which gives advance notice contains information relating to a scheduled change time or a time interval until the scheduled change time, and information relating to the transmission parameters or transmission modes scheduled after the change.

10. A cellular telecommunication system as set forth in claim 9, wherein the means for switching and selecting includes a means for receiving the advance notice information and storing its scheduled change time and the transmission parameters or transmission modes scheduled after the change; and a means for, when a control signal has been received erroneously at the scheduled change time, transmitting and receiving after switching to transmission parameters or transmission modes that have been stored in the storing means.

11. A cellular telecommunication system as set forth in one of claims 6–10, further comprising;

a means for monitoring a series of communication protocols based on one and the same transmission parameters or transmission modes, and which gives advance notice of the end of the series.

* * * * *